US006558167B2

(12) United States Patent
Harmon et al.

(10) Patent No.: US 6,558,167 B2
(45) Date of Patent: May 6, 2003

(54) NOSEBOX WITH INTERCHANGEABLE CONNECTOR ASSEMBLIES FOR TRACTORS AND TRAILERS

(75) Inventors: Darren L. Harmon, Madison, IN (US); Merrill W. Nay, Madison, IN (US); Mark D. Noe, Brandenburg, KY (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 09/767,165

(22) Filed: Jan. 22, 2001

(65) Prior Publication Data

US 2002/0098718 A1 Jul. 25, 2002

(51) Int. Cl.⁷ ................................................ H01R 33/00
(52) U.S. Cl. ..................................................... 439/35
(58) Field of Search ........................ 439/35, 660, 655, 439/646, 647, 651, 709, 721, 796, 638, 736, 357, 45, 912

(56) References Cited

U.S. PATENT DOCUMENTS

| | | | |
|---|---|---|---|
| 2,193,893 A | | 3/1940 | Van Vleck |
| 3,497,707 A | | 2/1970 | Stewart |
| 4,121,066 A | | 10/1978 | Horowitz |
| 4,390,222 A | * | 6/1983 | Carter ..................... 439/45 M |
| 4,770,644 A | | 9/1988 | Feder |
| 4,964,809 A | * | 10/1990 | Jobson ........................ 439/357 |
| 5,302,141 A | | 4/1994 | O'Reilly et al. |
| 5,443,389 A | * | 8/1995 | Hughes ........................ 439/35 |
| 5,476,273 A | * | 12/1995 | Shadeck et al. .............. 279/60 |
| 5,488,352 A | | 1/1996 | Jasper |
| 5,543,581 A | | 8/1996 | Kurata et al. |
| 5,739,592 A | | 4/1998 | Rigsby et al. |
| 5,854,517 A | | 12/1998 | Hines |
| 5,917,632 A | | 6/1999 | Leseky |
| 5,920,128 A | | 7/1999 | Hines |
| 6,007,346 A | | 12/1999 | Gutierrez et al. |

* cited by examiner

Primary Examiner—Renee Luebke
Assistant Examiner—Phuongchi Nguyen
(74) Attorney, Agent, or Firm—Woodard, Emhardt, Naughton Moriarty & McNett LLP

(57) ABSTRACT

The present invention provides a nosebox having an interchangeable connector assembly contained in a housing, for making electrical connection between a tractor and a trailer. The nosebox housing is sized to receive electrical conduits in excess of the size and/or number (seven) proscribed by the SAE J-560 standards and is adapted to securely attach to either the tractor or the trailer. The nosebox housing includes a cover member hingedly attached to a tray member. When closed, the cover member seals against the tray member, thus preventing water from entering the interior of the box. Additionally, the interior of the nosebox is contoured for directing electrical conduits without pinching them.

The interchangeable connector assembly is detachably mounted inside the nosebox housing and is easily removable for repair or replacement. The interchangeable connector assembly also meets SAE-J560b standard. The interchangeable connector assembly offers push-on sealed plug connections, stacking ring-terminal connections, and circuit breaker protection in different embodiments.

29 Claims, 19 Drawing Sheets

NOSEBOX WITH INTERCHANGEABLE CONNECTOR ASSEMBLIES FOR TRACTORS AND TRAILERS

FIELD OF THE INVENTION

The present invention relates generally to systems for interfacing electrical power and electronic communications between a tractor and a trailer, and more specifically to a nosebox having interchangeable connector assemblies.

BACKGROUND OF THE INVENTION

For the past few decades, the freight hauling industry has relied on a tractor/trailer combination for hauling cargo over long distances. These combinations consist of a tractor that is mechanically coupled to a trailer so it can pull the trailer and its cargo. Because the trailer typically has no power source or control mechanisms, it is necessary to supply power and communicate control signals via a subsystem link from the tractor to the trailer for the proper functioning of the tractor/trailer combination. Since a tractor is not permanently linked to a specific trailer, it is desirable that this subsystem link comply with relevant industry standards in order for a tractor to be compatible with different trailers.

Electrical power exchange between a tractor and trailer is currently accomplished via a seven wire cable and an associated seven pin connector. This electrical connection system, capable of carrying seven separate circuits, provides electrical power for various trailer lighting functions such as turn signals, brake lamps, tail lamps, side marker lamps, clearance lamps and dome lamps, as well as a ground reference for these electrical circuits. In an effort to provide uniformity throughout the industry, the Society of Automotive Engineers (SAE) has promulgated standards for both the seven wire cable (SAE-J1067) and the associated seven pin connectors (SAE-J560b).

As used hereinafter, the term "tractor" refers to any vehicle having another vehicle in tow, and therefore includes medium or heavy duty trucks, tractor trucks and tractor truck/trailer combinations having a further vehicle or vehicles in tow The term "trailer" as used hereinafter refers to any vehicle towed by another vehicle, and therefore includes semi-trailers, and the like.

Referring to FIG. 1, a diagram of a typical prior art electrical connection system 50 for routing electrical power to an electrical trailer system is shown. A tractor 52 includes a tractor power system 54 which acts as a power source to provide electrical power to a tractor electrical system 56 when the tractor 52 is in operation. Connected to tractor electrical system 56 are seven electrical lines $58_1, 58_2, \ldots 58_7$, which are configured in accordance with SAE-J1067 standards. Electrical lines $58_1, 58_2, \ldots 58_7$ extend from tractor electrical system 56 into a connector housing 60, commonly referred to as a "tractor nosebox", which is typically attached to an exterior surface of tractor 52. Housing 60 has a seven conductor electrical connector 62 associated therewith, and electrical lines $58_1, 58_2, \ldots 58_7$ are connected thereto in accordance with SAE-J560b standards.

A trailer 64 includes a trailer electrical system 66 which is operable to provide the aforementioned trailer lighting functions. Connected to trailer electrical system 66 are seven electrical lines $68_1, 68_2, \ldots 68_7$ which are configured in accordance with SAE J-1067 standards. Electrical lines $68_1, 68_2, \ldots 68_7$ extend from trailer electrical system 66 into a connector housing 70, or "trailer nosebox", which is typically attached to an exterior surface of trailer 64. Housing 70 has a seven conductor electrical connector 72 associated therewith, to which electrical lines $68_1, 68_2, \ldots 68_7$ are connected in accordance with SAE-J560b standards.

A seven conductor connector/cable 74, or "power cord", connects tractor electrical connector 62 to trailer electrical connector 72 so that the tractor electrical system 56 controls, and provides electrical power to, the trailer electrical system 66.

Referring now to FIG. 2, a typical power cord 74 is shown. Power cord 74 includes an SAE-J1067 seven wire jacketed cable 76 with an SAE-J560b seven conductor plug connector 78 connected thereto at each end. Each plug connector 78 has a front face 82 and a socket guide 80 extending away from the front face 82. FIG. 3 shows the front face 82 of plug connector 78 which defines seven receptacles, or electrical terminals 84–96, therein, each of which forms an electrical connection with one of the seven wires contained within cable 76. The sizing and color standard of the seven circuit wires are set forth in SAE-J1067.

Referring now to FIG. 4, an example of a typical electrical connection between connector housing 60 (or 70), attached to tractor 52 (or trailer 64), and power cord 74 is shown. Connector housing 60 (70) typically includes a socket cover 116 connected to housing 60 (70) by hinged connection 118, which is biased, such that cover 116 provides an environmentally and mechanically protecting seal over socket 114 when not in use. Socket 114 has been generally referred as electrical connector 62 (or 72) (FIG. 1.) Socket 114 is configured complementary to plug 78 of power cord 74, and includes a socket guide slot 112 (FIG. 5) such that plug 78 may be received within socket 114 having socket guide 80 aligns with socket guide slot 112 when cover 116 is lifted to expose socket 114. Cover 116 also typically includes a projection 120 which operates to engage socket guide 80 of plug 78, which, under the normal bias of cover 116 provided by hinged connection 118, acts to retain plug 78 within socket 114, thereby maintaining electrical connection therebetween.

FIG. 5 shows a cross-section, taken along section lines 5—5 of FIG. 4, of the electrical connection between plug 78 and socket 114. Socket 114 includes seven "pins" or electrical terminals 122–134, which are typically configured in accordance with SAE-J560b standards, and which are received within corresponding receptacle terminals 84–96 of plug 78. The specifics of the sizing and geometry standards of SAE-J1067 cable and SAE-J560b plugs and sockets are set forth in "Seven Truck-Trailer Jumper-Cable," of the 2000 SAE Handbook. Generally, for a SAE-J560b socket, the seven pins are positioned in a standard pattern such that a central pin surrounded by six pins spaced equiangularly from each other and from the center pin. Per the SAE-J560b standard, the pin located at the 12 o'clock position, in reference to the socket guide slot 112, is slightly larger in diameter than the other six standard pins. Traditionally, the pins are referred to by the color and/or function of the circuit wire to which the pins are ultimately connected, i.e. pin 122 at the 12 o'clock position is white for the main ground circuit, pin 128 at the 6 o'clock position is for the red circuit, pins 124, 126, 130, 132, 134 are black, yellow, blue, green, and brown, respectively.

Recently, technological advances in the tractor/trailer industry have created a need to provide tractors and trailers with additional electrical functions. Examples of such functions include anti-lock brakes, lift gates, and electronic suspension control, as well as diagnostic control and fault detection of various trailer functions. Furthermore, there is a desire within the industry to have the capability of providing for a parallel main harness when a double trailer hook-up is required. The prior art interface system as described in FIG. 1 does not have the capacity to provide for the extra functions. A recent government ruling further aggravates the problem by dedicating the blue circuit to the trailer anti-lock brake system (ABS). Although provisions for additional power cables and connectors may be a viable solution in the short term, this approach is generally a costly solution since that tends to limit compatibility between tractors and trailers. Additionally, it is still generally considered desirable by owners and operators of tractor/trailer combinations to maintain the use of the universal J560b plugs, sockets and the associated J1067 power cords. However, before the universal J560/J1067 hardware standard is to be used to provide electrical interface for the added communication and power needs, two issues must be addressed. First, the system must provide the capability of loading multiple functions on one circuit. Secondly, the system must provide connection points for the added functions.

An example of a design utilizing the SAE-J1067/J560b electrical interface system to provide added data communications and electrical power routing between a tractor and trailer is set forth in U.S. Pat. No. 5,739,592. This design incorporates communication and power switching circuitry to permit power and communications to be selectively routed with the same circuit so as to provide dedicated power to the trailer while maintaining normal trailer electrical functions. Other known designs are set forth in U.S. Pat. Nos. 5,854,517 and 5,920,128. These systems transmit communication data while the circuit power function is inactive. The above cited patents are all assigned to the same assignee as the present invention. While these innovative circuit designs may have addressed the capability issue of using one circuit for multiple power and communication functions, these systems did not address the second issue of providing extra terminal receptacles allowing the added functions to connect to the circuits.

What is therefore needed are connector assemblies which are compatible with existing SAE-J1067/J506b power cords and plugs but which also permit new electrically controlled tractor/trailer functions and features to be connected to the existing circuits without additional electrical connection hardware or splicing. Ideally, these connector assemblies should have different connection configurations suited to the particular needs of a specific tractor/trailer. Additionally, such assemblies should be removable providing the flexibility of changing a configuration or replacing a damaged unit. Furthermore, the connector assemblies should provide circuit breaker protection. The present invention is designed to meet the above needs.

SUMMARY OF THE INVENTION

The present invention provides a nosebox for making electrical connection between a tractor and a trailer. The nose box is adapted to securely attach to either the tractor or the trailer and includes an interchangeable connector assembly detachably mounted within the nosebox housing. The interchangeable connector assemblies feature SAE-J560b/J1067 interface compatibility, while at the same time providing multiple connecting positions for added electrical functions, e.g., anti-lock brakes, lift gates, parallel main harness, etc., to connect to the circuits bridging between the tractor and trailer combination. The present invention also provides several embodiments of interchangeable connector assemblies, allowing electrical interfacing via conventional push-on-sealed plugs, ring terminals, with circuit breaker protection.

The nosebox housing is sized to accommodate the interchangeable connector assemblies and the extra electrical wires and cables. The nosebox housing includes a tray member hingeably engaged to a cover member. The cover member can be secured to the tray member with locking bolts. The cover member further includes an outer flange which seals around the tray member and preventing water from entering the interior of the housing when closed. Additionally, the inside surface of the cover member has a "U" shaped wall that pushes the wires into the interior of the housing when the cover member closes onto the tray member, and preventing the cable wires from being pinched or cut.

One aspect of the present invention is to provide a nosebox for making electrical connections between a tractor and a trailer, comprising a housing, an interchangeable connector assembly having a plurality of conductors electrically connected to a socket, wherein the plurality of conductors are adapted to receive electrical cables, and said socket is adapted to receive circuits bridging between the tractor and the trailer, and the electrical cables are detachably engaged to the plurality of conductors of the connector assembly, and the connector assembly is detachably mounted in the housing, whereby the connector assembly may be easily removed from the housing for repair or replacement.

Another aspect of the present invention is to provide a nosebox-plug interchangeable connector assembly comprising a body, a plurality of primary conducting pins extending from said body and configured as a socket, wherein each of the primary conducting pins is adapted to receive connection to a circuit, a plurality of additional conductors extending from the body, the plurality of additional conductors exceeding the plurality of primary conducting pins in number, and wherein each of the plurality of primary conducting pins is electrically connected to at least one of the plurality of additional conductors, and wherein the additional conductors are adapted to receive terminal connectors, thereby the additional conductors providing additional electrical connection points to the circuits received by the primary conducting pins.

Yet another aspect of the present invention is to provide a stacking ring terminal interchangeable connector assembly comprising a body, a plurality of primary conducting pins extending from the body and configured as a socket, and wherein each the primary conducting pin is adapted to receive connection to a circuit, a plurality of secondary conducting pins extending from the body, wherein the secondary conducting pins are adapted to receive multiple ring terminals, and wherein each the secondary pins is connected to one of the primary conducting pins, whereby the secondary pins provide extra connection points to the circuits received by the primary pins.

A yet further aspect of the present invention is to provide a circuit breaker interchangeable connector assembly comprising a body, a plurality of primary conducting pins extending from the body, wherein the primary conducting pins are configured as a socket and adapted to receive connection to a circuit, a plurality of circuit breakers having terminal posts, wherein the terminal posts are adapted to receive multiple terminal connectors, a plurality of sets of contact plates extending through the body, each the set of contact plates includes an inner contact plate and an outer contact plate, wherein the inner contact plates are electrically connected to respective ones of the primary conducting pins, and wherein the circuit breakers are coupled between respective ones of the sets of contact plates, thereby providing circuit breaker protection and multiple connection points to the circuits received by the primary conducting pins.

A still further aspect of the present invention is to provide a method of making an interchangeable connector assembly comprising the steps of (a) providing a plurality of primary conducting pins, the primary pins being configured as a socket, wherein each primary conducting pin is adapted to receive connection to a circuit from an incoming cable; (b) providing a plurality of additional conductors; (c) providing a plurality of connecting conductors; (d) connecting the primary conducting pins to respective ones of the connecting conductors and connecting the additional conductors to selected ones of the connecting conductors, thereby electrically connecting the primary conducting pins to the additional conductors; (e) providing a mold; (f) arranging the primary conducting pins, the connecting conductors and the additional conductors in the mold in a predetermined configuration; (g) filling the mold with an insulating fluid molding compound; and (h) curing the fluid molding compound to form a rigid plate completely enclosing the bar conductors.

One object of the present invention is to provide an interchangeable connector assembly for a nosebox where the connector assembly is detachably mounted and can be easily removed for repair or replacement.

Another object of the present invention is to provide multiple interchangeable connector assemblies for reconfiguring the electrical interfacing of the tractor/trailer combination.

Yet another object of the present invention is to provide a connector assembly which includes multiple connection points for tractor/trailer electrical functions to connect to the circuits bridging the tractor and trailer.

Related objects and advantages of the present invention will be apparent from the following description.

DESCRIPTION OF THE PREFERRED EMBODIMENTS

Figure 1:
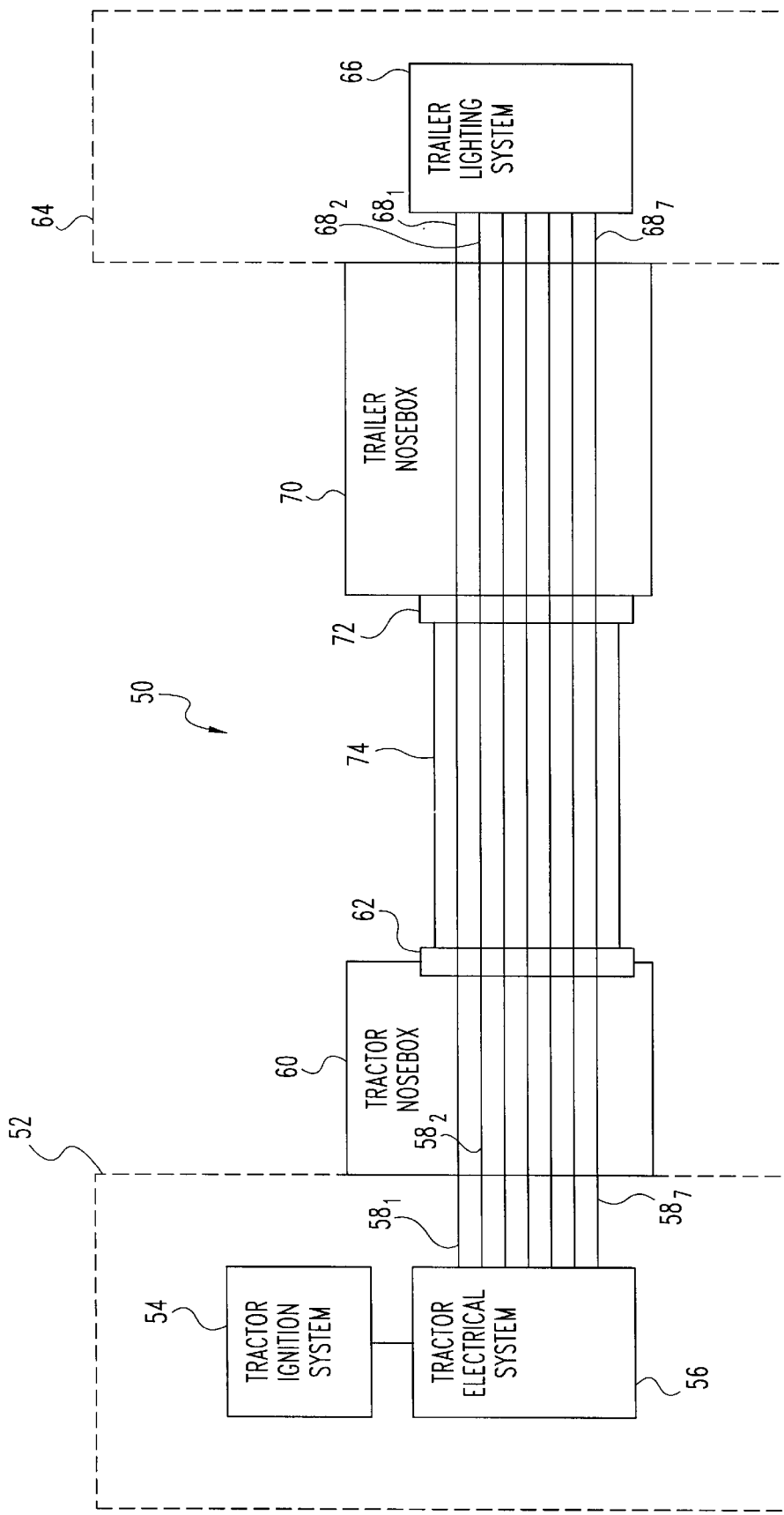
FIG. 1 is a diagrammatical illustration of a prior art electrical interface between a tractor electrical system and a trailer electrical system.
Figure 2:
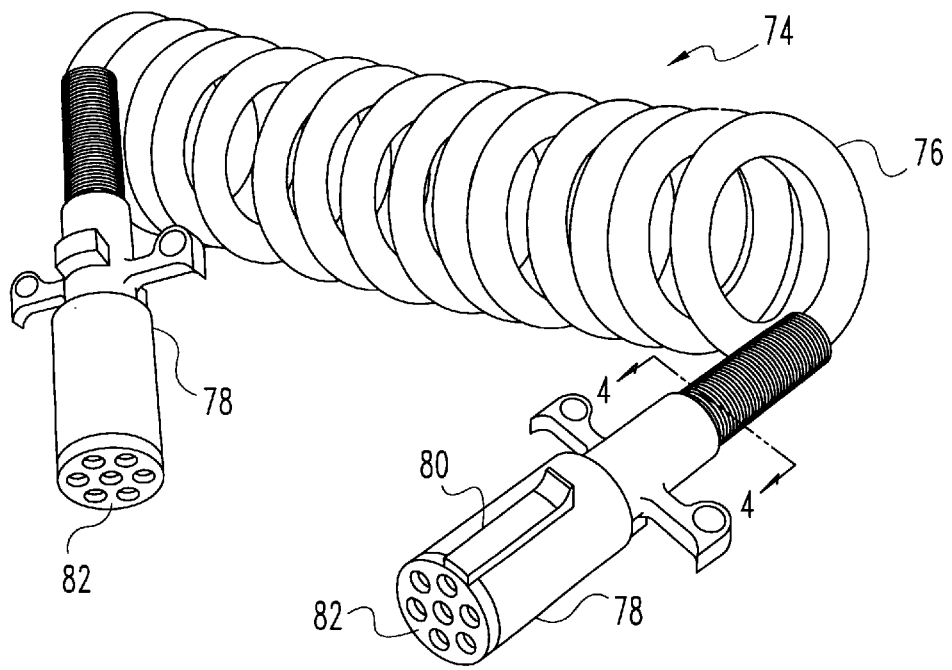
FIG. 2 is a perspective view of a prior art seven conductor electrical cable with plug connectors for use as an electrical interface between a tractor and a trailer.
Figure 3:
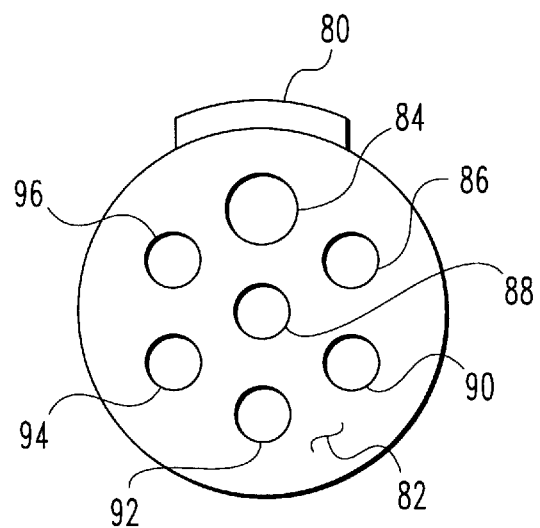
FIG. 3 is a front elevational view of a prior art seven terminal plug connector for use with the prior art seven conductor electrical cable of FIG. 2.
Figures 4, 5:
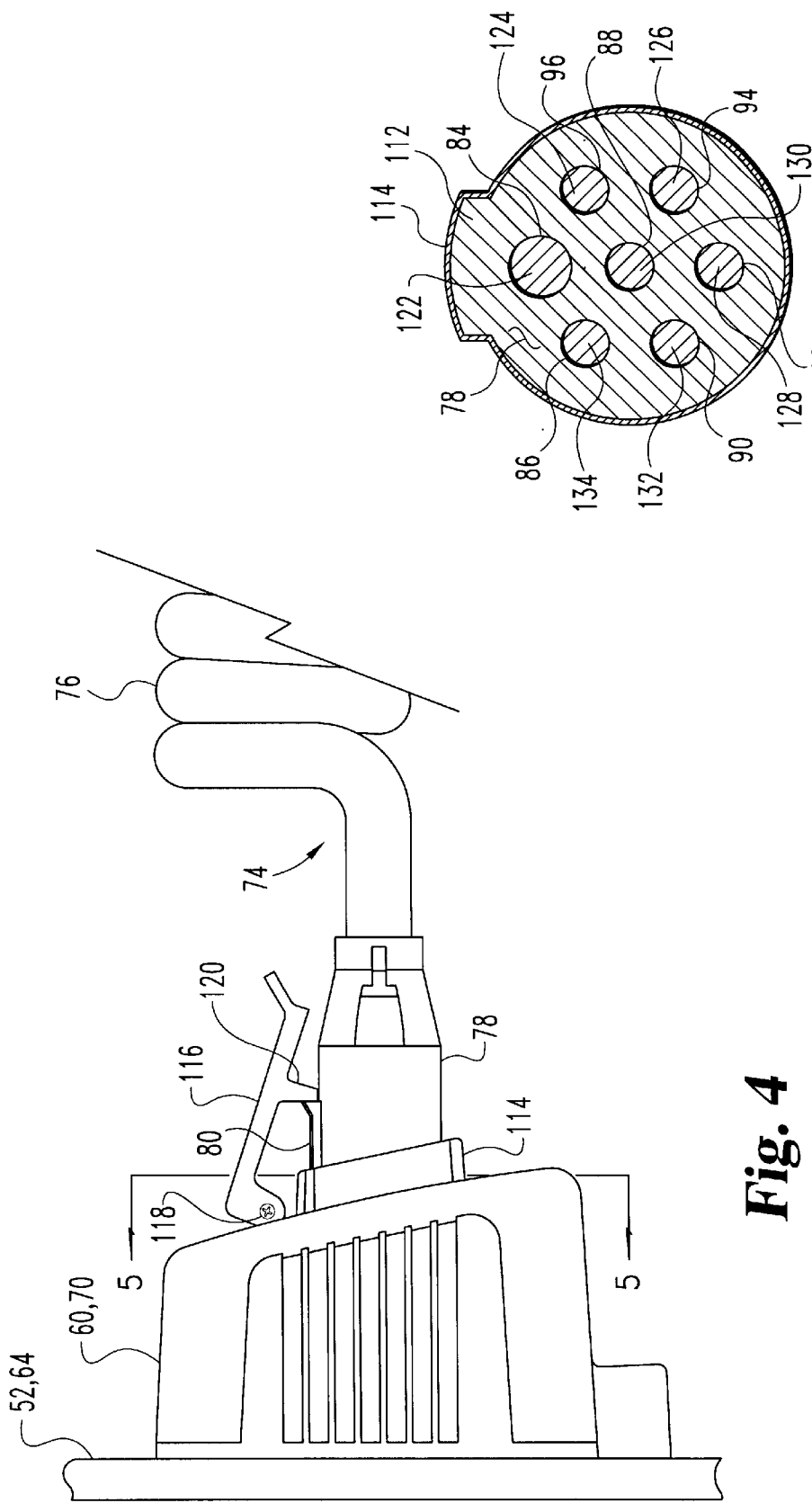
FIG. 4 is a side elevational view of an electrical connection between the prior art seven conductor electrical cable of FIG. 2 and a seven terminal electrical socket of a tractor or trailer.
FIG. 5 is a cross-sectional view of the electrical connection of FIG. 4 taken along section line 5—5 of FIG. 4.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates are also included.

Figure 6:
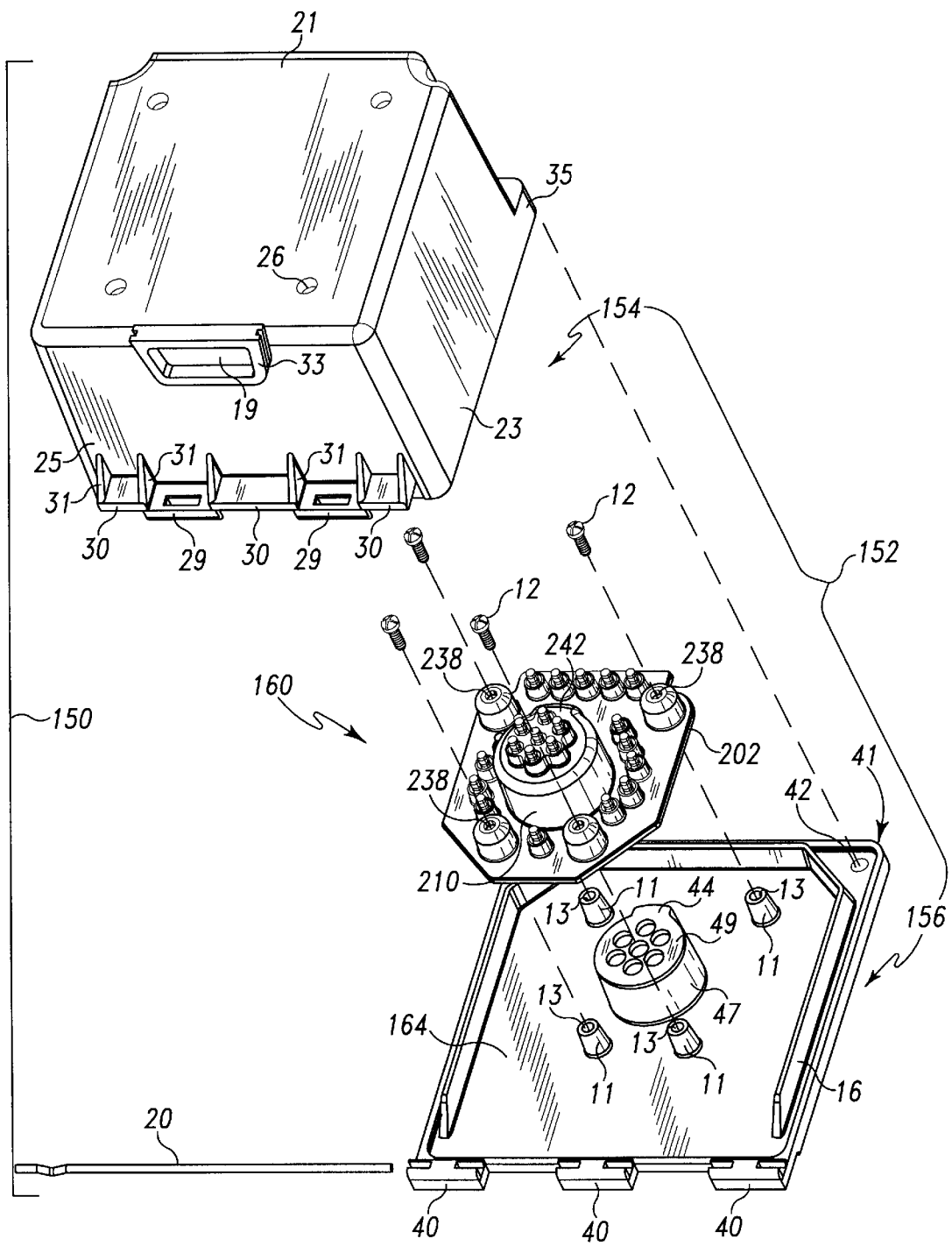
FIG. 6 is an exploded view of an electrical connector housing, or nosebox, of the present invention.

FIG. 6 illustrates an embodiment of an electrical connector housing, or nosebox, 150 of the present invention. Nosebox 150 includes a housing 152 and an interchangeable connector assembly 160 contained therein. The present invention provides several embodiments of interchangeable connector assembly 160. A nosebox plug connector assembly 202, a first embodiment of an interchangeable connector assembly 160, is illustrated in FIG. 6. Housing 152 is specifically designed to house the interchangeable connector assemblies 160 and is also adapted to securely attach to either a tractor or a trailer. Connector assemblies 160 are detachably mounted to nosebox housing 152 and can be easily removed for servicing or exchanging for other connector assemblies 160. Each embodiment of connector assemblies 160 includes special features designed to meet specific needs of interfacing the electrical systems 56, 66

(FIG. 1) of the tractor/trailer combination. Four embodiments of interchangeable connector assemblies 160 will be illustrated. Features of the housing 152 will also be discussed.

A. Nosebox Plug Connector Assembly

Figure 7:
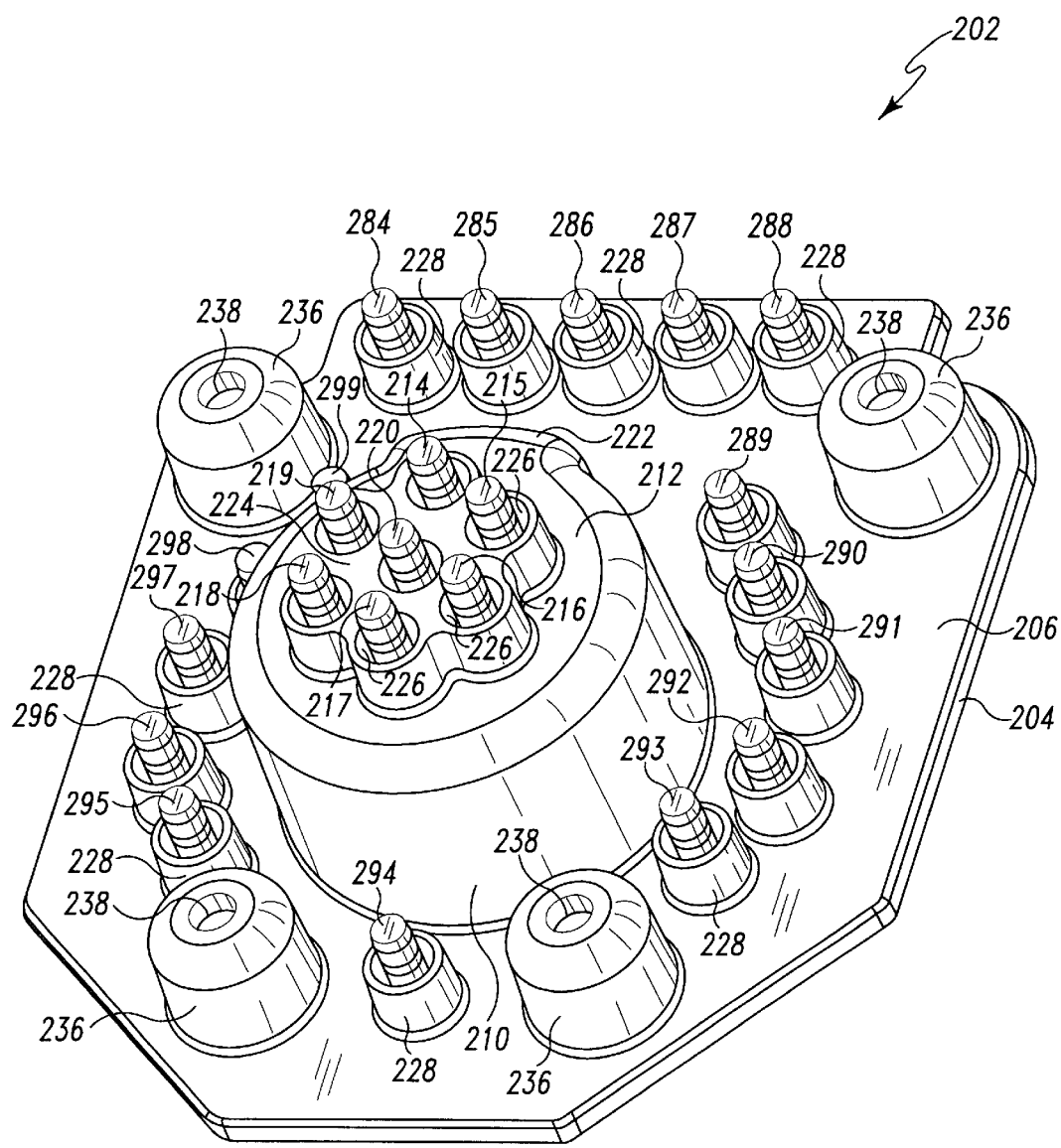
FIG. 7 is a perspective view of the first side of a nosebox plug connector assembly, which illustrates a portion of a first embodiment of the interchangeable connector assembly of the present invention.
Figure 8:
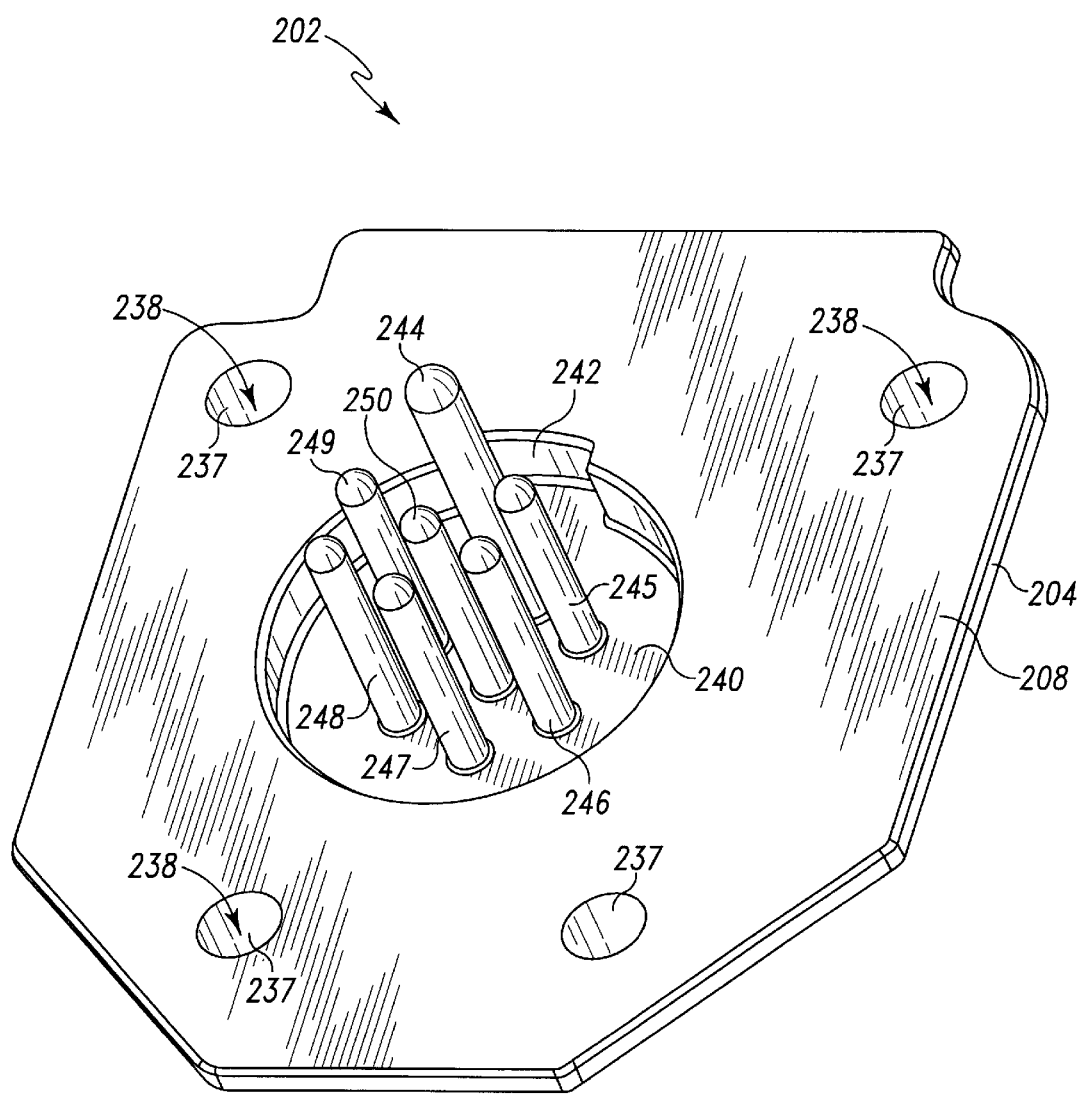
FIG. 8 is a perspective view of the second side of the nosebox plug connector of FIG. 7.
Figure 9:
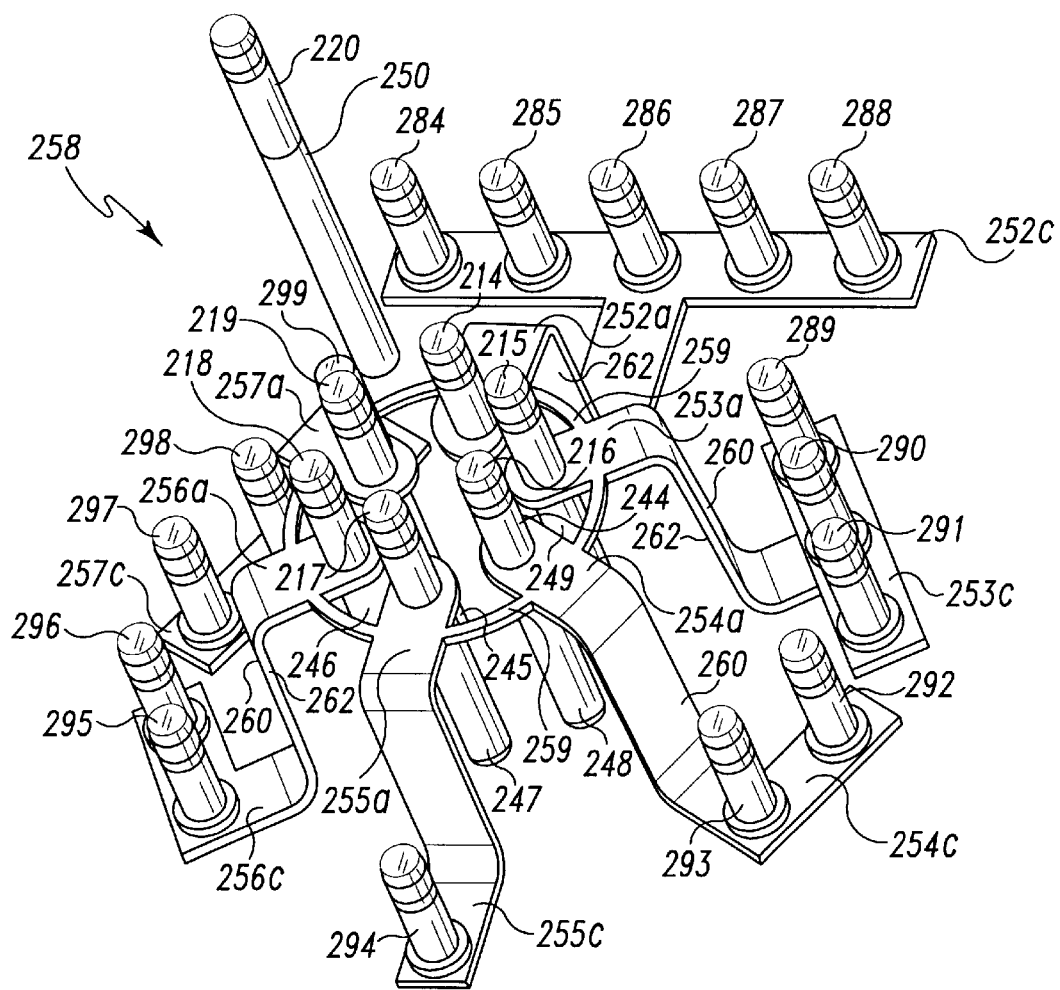
FIG. 9 is a perspective view of the electrical connection of the nosebox plug connector assembly of FIG. 7.

FIGS. 7–9 show a nosebox plug connector assembly 202, a first embodiment of the interchangeable connector assembly 160 of the present invention. Push-on-sealed plug or nosebox plug connector assembly 202 provides additional connecting positions for conventional nosebox plug connectors to the electrical circuits, thus eliminating the common but undesirable practice of splicing into the electrical circuit wires. FIGS. 7 and 8 show the exterior features of nosebox plug connector assembly 202. FIG. 9 shows the electrical connections of nosebox plug connector assembly 202. Nosebox plug connector assembly 202 is of a one-piece construction, having a plate-like body 204 which includes a first side 206 and a second side 208.

Referring now to FIG. 7 which shows first side 206 of nosebox plug connector assembly 202, centrally defined on first side 206 is a turret 210 which extends above first side 206. Turret 210 includes a top face 212 and a key projection 222 protruding from the side of turret 210. Key projection 222 extends from top surface 212 to first side 206. Extending from top face 212 of turret 210 is a raised section 224 which contains seven wells 226. Seven secondary conducting pins or secondary pins 214–220 extend above raised section 224 from wells 226. Raised section 224 provides support to the secondary conducting pins 214–220, while wells 226 allow adequate access for the plug terminals to contact secondary conducting pins 214–220. Surrounding turret 210 are sixteen free-standing wells 228 each having a secondary conducting pin or secondary pins 284–299 extending therefrom. The secondary conducting pins 214–220 and 284–299 as a group are also referred to as additional conductors.

Secondary pins 214–220 and 284–299 provide added connection points to the electrical circuits bridging the tractor/trailer combination. In the illustrated embodiment where the bridging circuits are configured according to the SAE-J1067 standard, secondary pins 214 and 284–288 are for connection to the white circuit, secondary pins 215 and 289–291 are for connection to the brown circuit, secondary pins 216 and 292–293 are for connection to the green circuit, secondary pins 217 and 294 are for connection to the red circuit, secondary pins 218 and 295–296 are for connection to the yellow circuit, secondary pins 219 and 297–299 are for connection to the black circuit, and secondary pin 220 is for connection to the blue circuit. Additionally, secondary pins 214–220 and 284–299 are adapted to receive conventional push-on-sealed plug terminals. Preferably, secondary pins 214–220 and 284–299 are approximately 0.18 inches in diameter. While the illustrated number of secondary pins 214–220 and 284–299 are provided for each of the SAE-J1067 circuits, it is contemplated that a greater or lesser number of secondary pins 214–220 and 284–299 may be utilized without deviation from the spirit and scope of the invention.

A set of mounting bosses 236 are also provided on body 204. Mounting bosses 236 extend from first side 206 and include apertures 238. Apertures 238 are adapted for receiving bolts or screws for attaching nosebox plug connector assembly 202 to nosebox housing 152. Preferably, mounting bosses 236 are spaced a distance apart for an even distribution of attachment forces.

Referring now to FIG. 8, which shows second side 208 of nosebox plug connector assembly 202. Recessed within second side 208 is turret cavity 240 which complements turret 210 defined on first side 206. Extending from turret cavity 240 are seven primary conducting pins or primary pins or central pins 244–250 which are configured as a socket for receiving a SAE-J560b plug connector of a SAE-J1067 cable. While the nosebox plug connector assembly 202 as illustrated is adapted to the SAE-J560b interfacing standard, it is to be understood that the present invention contemplates providing a connector assembly for push-on-seal plug (or other style) terminals having other than a SAE-J560b configuration.

Situated directly behind central conducting pin 244, on the wall of turret cavity 240, is key slot 242. Key slot 242 complements key projection 222 defined on first side 206. Key slot 242 provides guidance for aligning connector assembly 202 to nosebox housing 152. Spaced apart at the corners of body 204 are recesses 237, which correspond to mounting bosses 236 defined on first side 206. Each of the recesses 237 is adapted for engaging nosebox housing 152.

Referring now to FIG. 9, which shows the electrical connections between primary pins 244–250 and secondary pins 214–220 and 284–299 of nosebox plug connector assembly 202. Electrical connections are made and organized by the use of connecting conductors, specifically bar conductors 252–257. Conducting pins which are connected to the same bar connectors are electrically connected. Bar conductors 252–257 include first and second surfaces, 260 and 262, respectively, and both surface 260, 262, are capable of receiving conducting pins. In one embodiment, bar conductors 252–257 are stamped out as a single piece and formed into a track 258 as shown in FIG. 9. A single track 258 of bar conductors would facilitate the assembly of the multiple types of conducting pins. The links 259 between bar conductors 252–257 would be separated later to provide individual circuits. It will be appreciated by those skilled in the art that other conventional processes of producing bar conductors 252–257 may be used in place of the stamped and formed process. For example, bar conductors 252–257 may be formed as individual pieces and assembled before molding. Additionally, it is preferred that bar conductors 252–257 be made of brass. However, other conducting material having suitable electrical conductivity and formability may also be used.

In the illustrated embodiment, each of the bar conductors 252–257 are bent to a step shape defining a central portion 252a–257a and an auxiliary portion 252c–257c. Central portions 252a–257a and auxiliary portions 252c–257c are adapted to receive additional conductors. As illustrated, auxiliary portions 252c–257c are of different widths depending on the number of secondary conducting pins to be attached thereon and the placement geometry.

Connecting to, and extending above, first surface 260 of bar conductors 252–257 are secondary pins 214–219 and 284–299. Connecting to, and extending below, second surface 262 of bar conductors 252–257 are primary pins or central pins 244–249. Primary pins 244–249, which are connected to central portions 252a–257a are part of a set of primary pins 244–250 which is adapted to meet SAE-J560b standard. Because the number of conductor bars 252–257 is one less than the number of primary conducting pins 244–250, primary conducting pin 250, which is not attached to a conductor bar, is joined to secondary pin 220. The joined primary/secondary conductor pin 250/220 is positioned among the attached primary pins 244–249, completing a socket in accordance with SAE-J560b standard. Each primary pin 244–250 within the socket is adapted to receive connection to a circuit of the SAE-J1067 cable. Primary conducting pin 244 being slightly larger in diameter than the other six primary conducting pins 245–250 is conventionally referred to as the white pin for accepting the ground or white circuit. Moving clockwise from primary pin 244 is primary pin 245 for accepting the black circuit, primary pin 246 for accepting the yellow circuit, primary pin 247 for accepting the red circuit, primary pin 248 for accepting the green circuit, primary pin 249 for accepting the brown circuit, and primary pin 250 for accepting the blue circuit.

Secondary conducting pins 214–219 are connected one each to first surface 260 of central portions 252a–257a. Varying numbers of secondary pins 284–299 are attached to first surface 260 of auxiliary portions 252c–257c. In the illustrated embodiment, there are five secondary pins 284–288 connecting to auxiliary portion 252c, three secondary pins 288–291 connecting to auxiliary portion 253c, two secondary pins 292–293 connecting to auxiliary portion 254c, one secondary pins 294 connecting to auxiliary portion 255c, two secondary pins 295–296 connecting to auxiliary portion 256c, and three secondary pins 297–299 connecting to auxiliary portion 257c.

After primary conducting pins 244–250 and secondary pins 214–220 and 284–299 are connected to bar connectors 252–257 and to each other as described above, secondary pins 214 and 284–288 are electrically connected to primary pin 244, thus providing connections to the white circuit; secondary pins 215 and 289–291 are electrically connected to primary pin 249, thus providing connections to the brown circuit; secondary pins 216 and 292–293 are electrically connected to primary pin 248, thus providing connections to the green circuit; secondary pins 217 and 294 are electrically connected to primary pin 247, thus providing connections to the red circuit; secondary pins 218 and 295–296 are electrically connected to primary pin 246, thus providing connections to the yellow circuit; secondary pins 219 and 297–299 are electrically connected to primary pin 245, thus providing connections to the black circuit; and secondary pin 220 is directly connected to primary pin 250, thus providing connection to the blue circuit. The secondary pins 214–220 and 284–299 therefore providing connecting positions for the many extra electrical functions to the seven circuits of the SAE-J1067 cable.

Preferably, central conducting pins 244–249 and secondary conducting pins 214–219 and 284–299 are secured to conductor bars 252–257 by insert welding. However, other methods which can conductively secure the conducting pins to the bar conductors may also be used. Additionally, while bar conductors are shown for making electrical connections in this illustrated embodiment, it is contemplated that other type of connecting conductors, for example, conductive wires, may also be used.

After the electrical connections are made, body 204 of nosebox plug connector assembly 202 is formed by insert molding. Insert molding assures a seal over the bar conductors and the welding joints, and thus reduces the probability of environmental corrosion. Additionally, insert molding allows better control and dimensional stability of the conducting pin locations. Insert molding generally involves assembling bar conductors 252–257 and the associated central pins 244–250, secondary pins 214–220, and auxiliary pins 284–299 as shown in FIG. 9 into a mold (not shown). A fluid non-conducting molding compound is dispensed into the mold sufficient to cover conducting bars 252–257 and the welded junctions, but allowing central conducting pins 244–250, secondary pins 214–220 and 284–299 to extend above the molding compound. The molding compound is then cured to a solid stage forming a rigid plate enclosing bar conductors 252–257, thereby stabilizing the pin positions and providing protection against moisture intrusion. Preferably, the molding compound is glass filled nylon. The amount of glass may vary depending on the strength and rigidity required. The preferred range is between 20–30% glass. While, insert molding with glass filled nylon is chosen for the illustrated embodiments, other non-conducting, moldable materials having the necessary strength and rigidity may also be used.

B. Stacking Ring Terminal Connector Assembly

Figure 10:
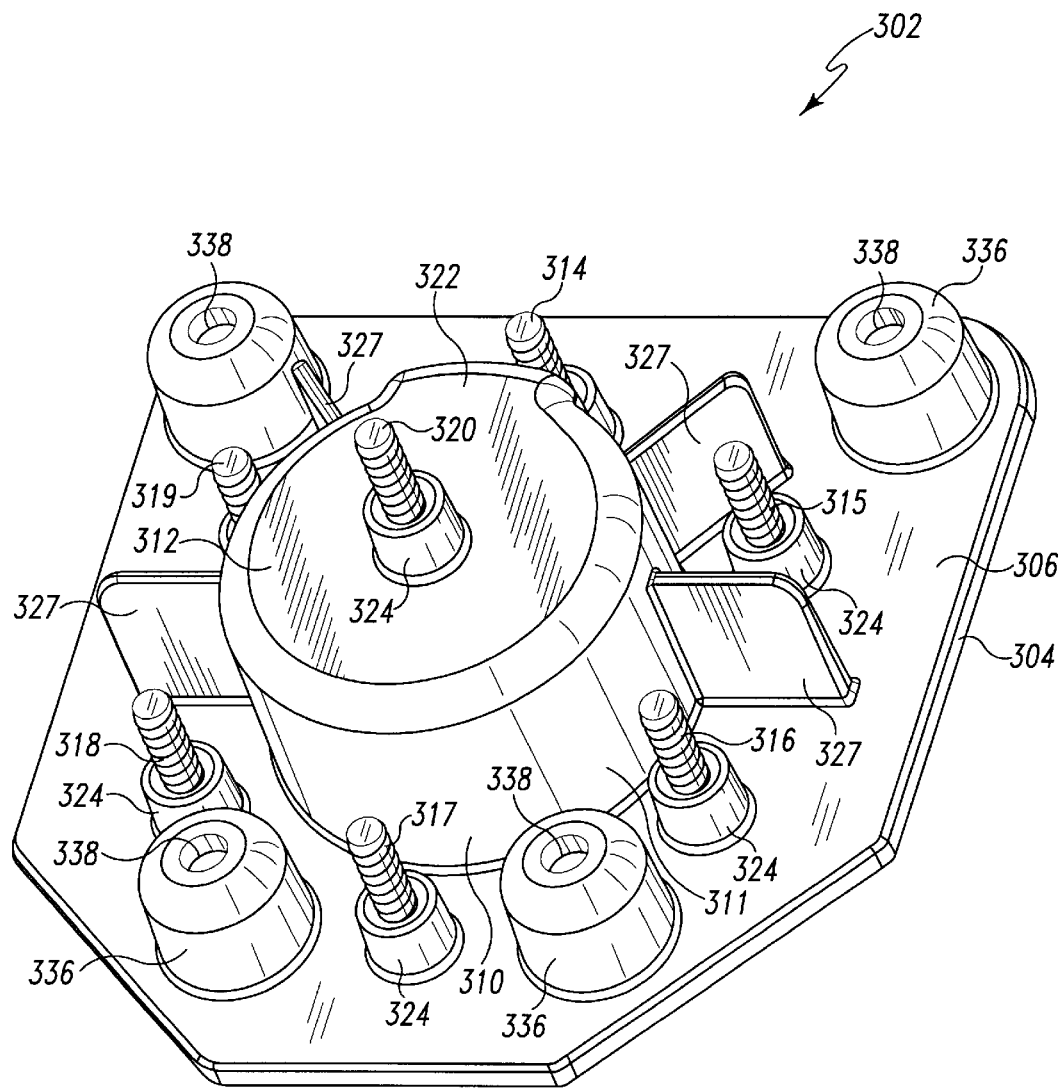
FIG. 10 is a perspective view of the first side of a ring terminal connector assembly, which illustrated a portion of a second embodiment of the interchangeable connector assembly of the present invention.
Figure 11:
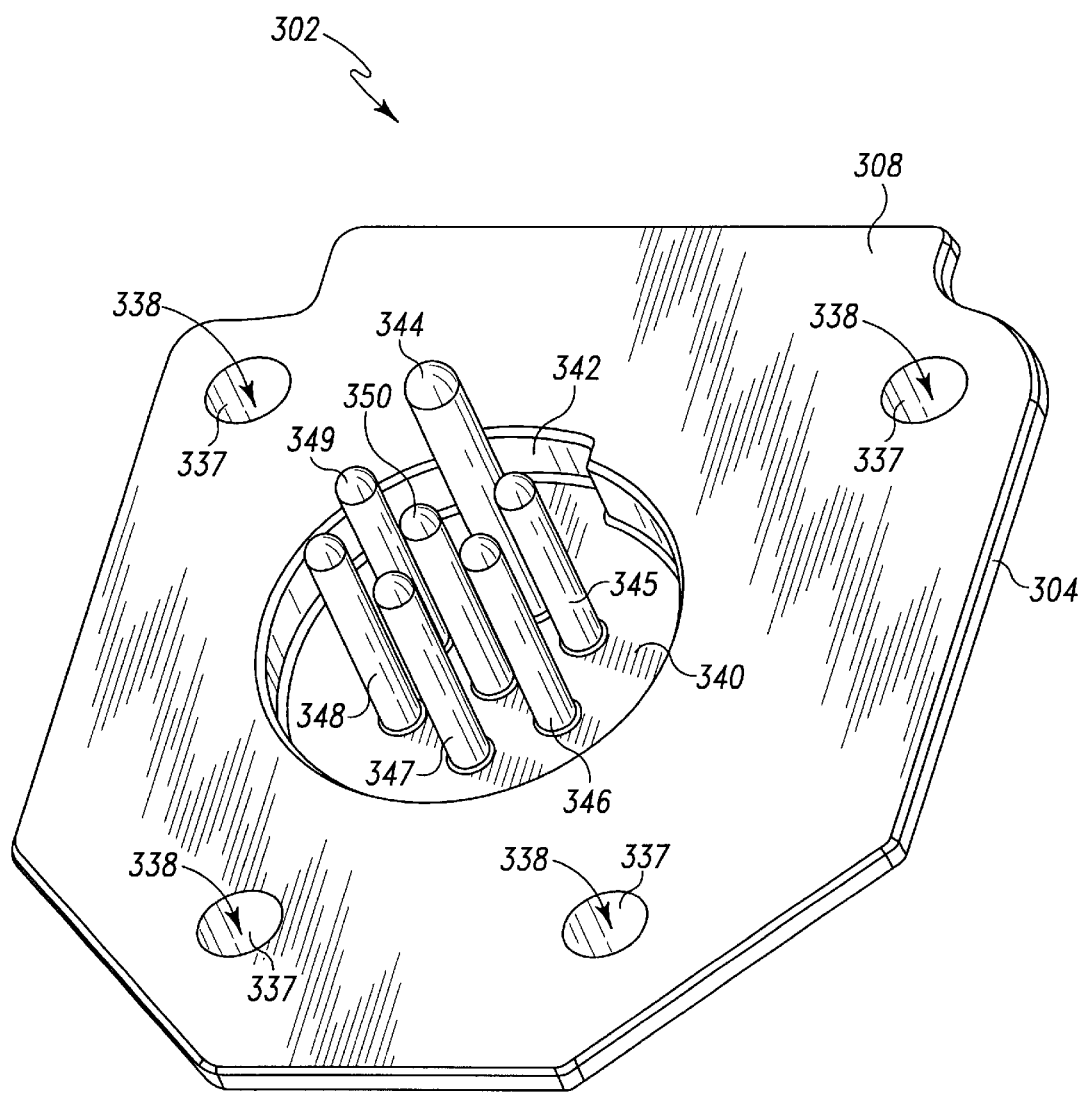
FIG. 11 is a perspective view of the second side of the ring terminal connector assembly of FIG. 10.
Figure 12:
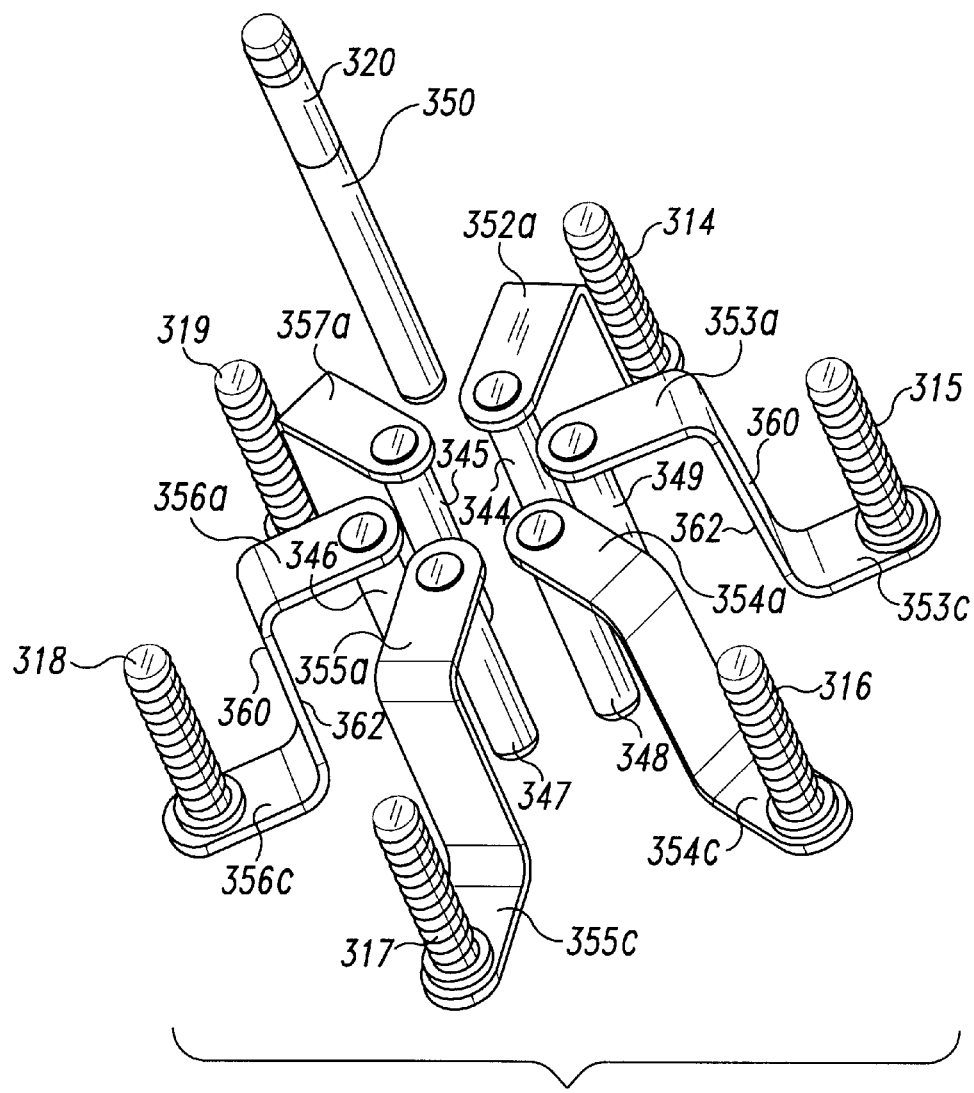
FIG. 12 is a perspective view of the electrical connection of the ring terminal connector assembly of FIG. 10.

FIGS. 10–12 show a stacking ring terminal or ring terminal connector assembly 302, a second embodiment of the interchangeable connector assembly 160 of the present invention. Ring terminal connector assembly 302 provides multiple connecting positions for ring terminal connectors in a stacking arrangement, thus eliminating the common but undesirable practice of splicing into cable wires. FIGS. 10 and 11 show the exterior features of ring terminal connector assembly 302. FIG. 12 shows the hidden electrical connections 304 of ring terminal connector assembly 302. Ring terminal connector assembly 302 is of a one-piece construction, having a plate-like body 304 including a first side 306 and a second side 308.

Referring now to FIG. 10, which shows first side 306 of stacking ring terminal connector assembly 302, centrally defined on first side 306 is turret 310 extending above first side 306. Turret 310 includes a side 311, a top face 312 and a key projection 322 protruding from side 311 and extending between top surface 312 and first side 306. Extending from top face 312 of turret 310 is a raised platform 324 having a secondary pin 320 protruding therethrough. Surrounding turret 310 are additional raised platforms 324, each having a secondary conducting pin 314–319 protruding therethrough. Raised platform 324 adds rigidity and stabilizing supports to secondary conducting pin 314–320 contained therein.

Secondary pins 314–320 are provided as connection points to the electrical circuits bridging the tractor/trailer combination. In the illustrated embodiment where the bridging circuits are configured according to SAE-J1067 standard, secondary pin 314 enables connection to the white circuit, secondary pin 315 enables connection to the brown circuit, secondary pin 316 enables connection to the green circuit, secondary pin 317 enables connection to the red circuit, secondary pin 318 enables connection to the yellow circuit, secondary pin 319 enables connection to the black circuit, and secondary pin 320 enables connection to the blue circuit. Secondary pins 314–320 are adapted to receive conventional ring-terminal connectors and are of sufficient height to accommodate a multiple of ring-terminal connectors by stacking. Preferably, secondary conducting pins 314–320 are #10 threaded post for accepting #10 ring-terminals. Divider panels 327 extend from side 311 of turret 310 toward the periphery of first side 306, together with mounting bosses 336, forming dividers separating each of secondary conducting pins 314–319, thus avoiding inadvertent contact of conducting terminal wires.

Mounting bosses 336 are provided for mounting ring terminal connector assembly 302 to nosebox housing 152. Mounting bosses 336 extend from first side 306 and include aperture 338 which are adapted to receive fasteners 12 (FIG. 6) for attachment to nosebox housing 152. Preferably, mounting bosses 336 are spaced a distance apart for an even distribution of attachment forces.

Referring now to FIG. 11 which shows second side 308 of stacking ring terminal connector assembly 302. Recessed within second side 308 is turret cavity 340 which complements to turret 310 defined on first side 306. Extending from turret cavity 340 are seven primary or central conducting pins 344–350, which are configured as a socket, for receiving a SAE-J560b plug connector of a SAE-J1067 cable. While ring terminal connector assembly 302, as illustrated, is adapted to be compatible with SAE-J560b standard, it is to be understood that the present invention contemplates providing a stacking ring terminal connector with electrical connection having other than a SAE-J560b configuration.

Situated directly behind white primary conducting pin 344 on the wall of turret cavity 340 is key slot 342. Key slot 342 complements key projection 322 formed on first side 306. Key slot 342 is provided as a guide for aligning stacking ring terminal connector assembly 302 to nosebox housing 152. Spaced apart at the corners are recesses 327 which correspond to mounting bosses 336 defined on first side 306. Recesses 327 are adapted for engaging nosebox housing 152.

Referring now to FIG. 12, which shows the electrical connections of ring terminal connector assembly 302, the electrical connections are made and organized by the use of connecting conductors, specifically, bar conductors 352–357. Conducting pins connected to the same bar conductor are electrically connected. Bar conductors 352–357 include first and second surfaces 360 and 362, respectively. As discussed previously, bar conductors 352–357 may be formed as a track or as separate pieces. In addition, bar conductor 352–357 are preferably formed of brass. However, other conducting materials having suitable electric conductivity and formability may be used. In the illustrated embodiment, each bar conductor 352–357 is bent into a "step" shape, defining a central portion 352a–357a and an auxiliary portions 352c–357c. Connecting to, and extending above, first surface 360 of auxiliary portions 352c–357c are secondary pins 314–319. Connecting to, and extending below, second surface 362 of central portions 352a–357a are primary conducting pins 344–349.

Primary pins 344–349 which are connected to central portions 352a–357a are part of a set of primary pins 344–350 meeting the SAE-J560b standard. Because the number of conductor bars 352–357 is one less than the number of primary conducting pins 344–350, primary conducting pin 350, which is not attached to a bar conductor 352–357, is joined to secondary pin 320. The joined primary/secondary conductor pin 350/320 is positioned among the attached primary pins 344–349, completing a socket in accordance with SAE-J560b standard. Each primary pin 344–350 within the socket is adapted to accept a terminal from an SAE-J5606 plug. Primary conducting pin 344 being slightly larger in diameter than the other six central conducting pins 345–350 is conventionally referred to as the white pin for accepting the ground or white circuit. Moving clockwise from primary pin 344 is central pin 345 for accepting the black circuit, primary pin 346 for accepting the yellow circuit, primary pin 347 for accepting the red circuit, primary pin 348 for accepting the green circuit, primary pin 349 for accepting the brown circuit, and primary pin 350 for accepting the blue circuit.

After the central pins 344–350 and secondary pins 314–320 are connected to bar connectors 352–357 and to each other as described above, secondary pin 314 is electrically connected to primary pin 344, thus providing connection to the white circuit; secondary pin 315 is electrically connected to primary pin 349, thus providing connection to the brown circuit; secondary pin 316 is electrically connected to primary pin 348, thus providing connection to the green circuit; secondary pin 317 is electrically connected to primary pin 347, thus providing connection to the red circuit; secondary pin 318 is electrically connected to primary pin 346, thus providing connection to the yellow circuit; secondary pin 319 is electrically connected to primary pin 345, thus providing connection to the black circuit; and secondary pin 320 is electrically connected to primary pin 350, thus providing connection to the blue circuit. Additionally, secondary pins 314–320 are adapted to accept a multiple of ring terminals; many extra electrical functions may therefore be connected to the seven circuits provided by the SAE-J1067 cable. Preferably, primary and secondary conducting pins 344–349 and 314–319, respectively, are connected to bar conductors 352–357 by insert welding. However, other methods which can conductively secure the conducting pins to the bar conductors may be used. Furthermore, while conductors 352–357 are used as electrical conductors in the illustrated embodiment, it is contemplated that other types of connecting conductors, for example conductive wires, may also be used.

After the various electrical connections are made, the bar conductors-conducting pins assembly is insert molded with an insulating fluid compound as previously described. The molding compound is cured to a solid state, forming a plate and sealing bar conductors 352–357 and the welding joints, thereby providing protection against environmental corrosion. Primary pins 344–350 and secondary pins 314–320 are also partially embedded in the molding compounds, whereby the pin positions are stabilized. Preferably the molding compound is glass filled nylon. The amount of glass may vary depending on the strength and rigidity required. The preferred range is between 20–30% glass. While glass filled nylon is chosen for the illustrated embodiments, other non-conducting, moldable materials having the necessary strength and rigidity may also be used.

C. Circuit Breaker-Ring Terminal Connector Assembly

Figure 13:
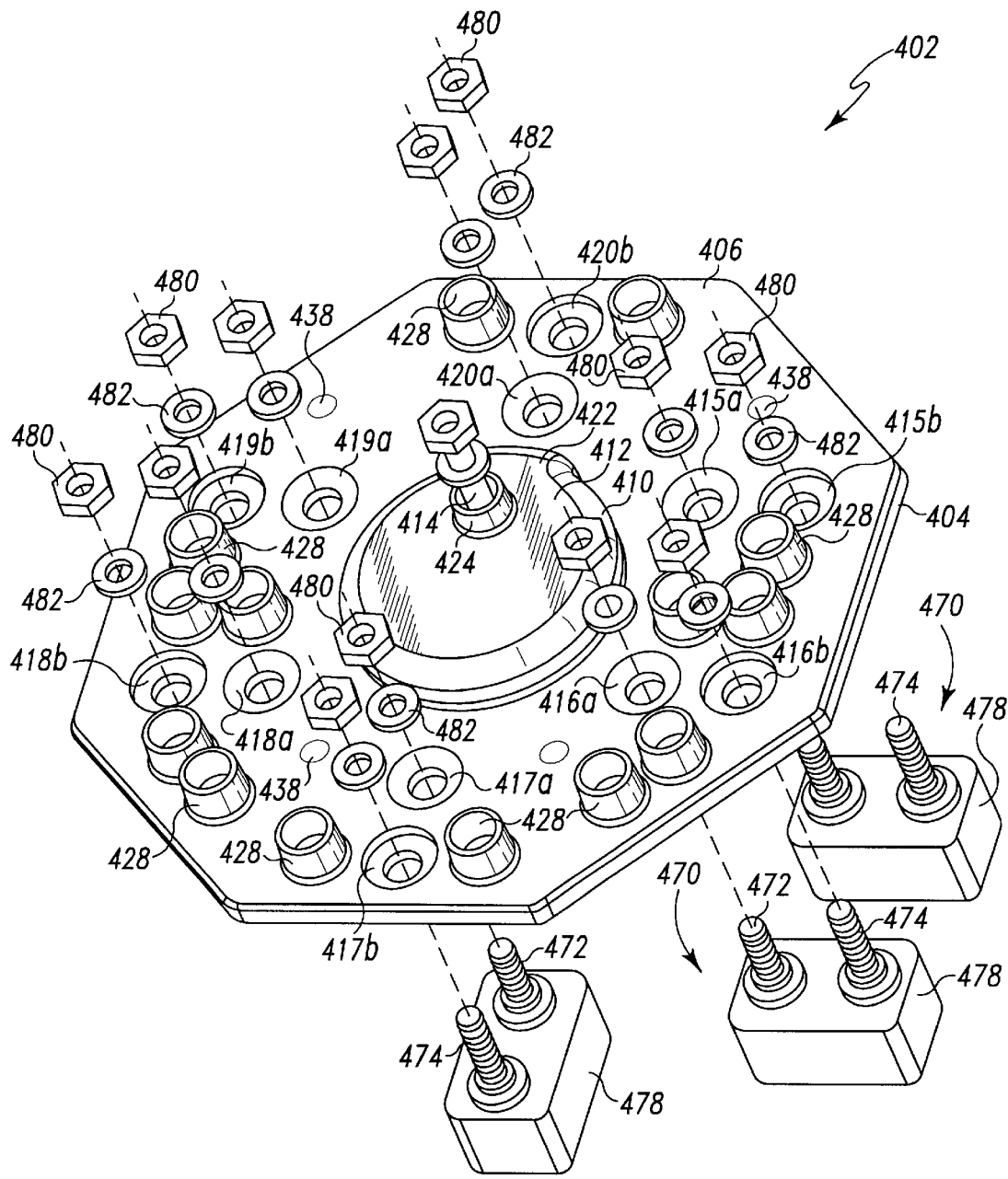
FIG. 13 is a perspective view of the first side of a circuit breaker-ring terminal connector assembly, which illustrates a portion of a third embodiment of the interchangeable connector assembly of the present invention.
Figure 14:
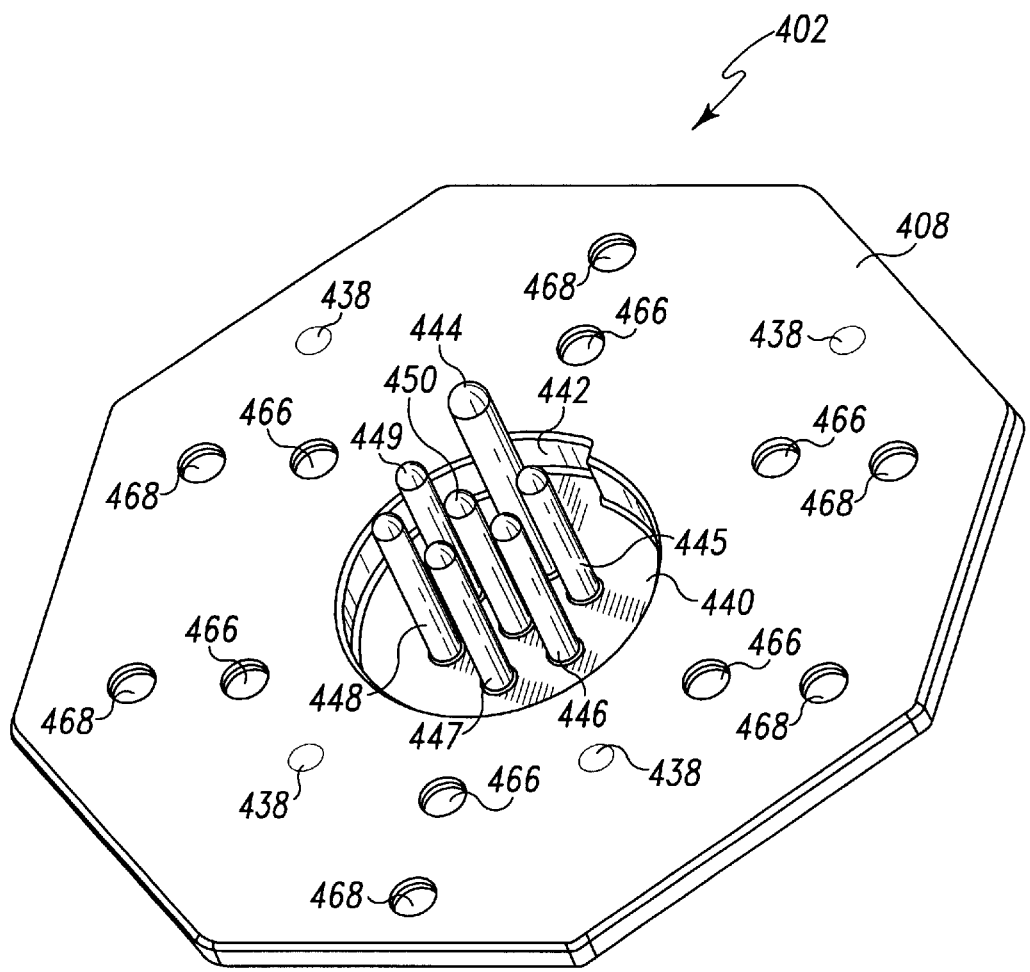
FIG. 14 is a perspective view of the second side of the circuit beaker-ring terminal connector assembly of FIG. 13.
Figure 15:
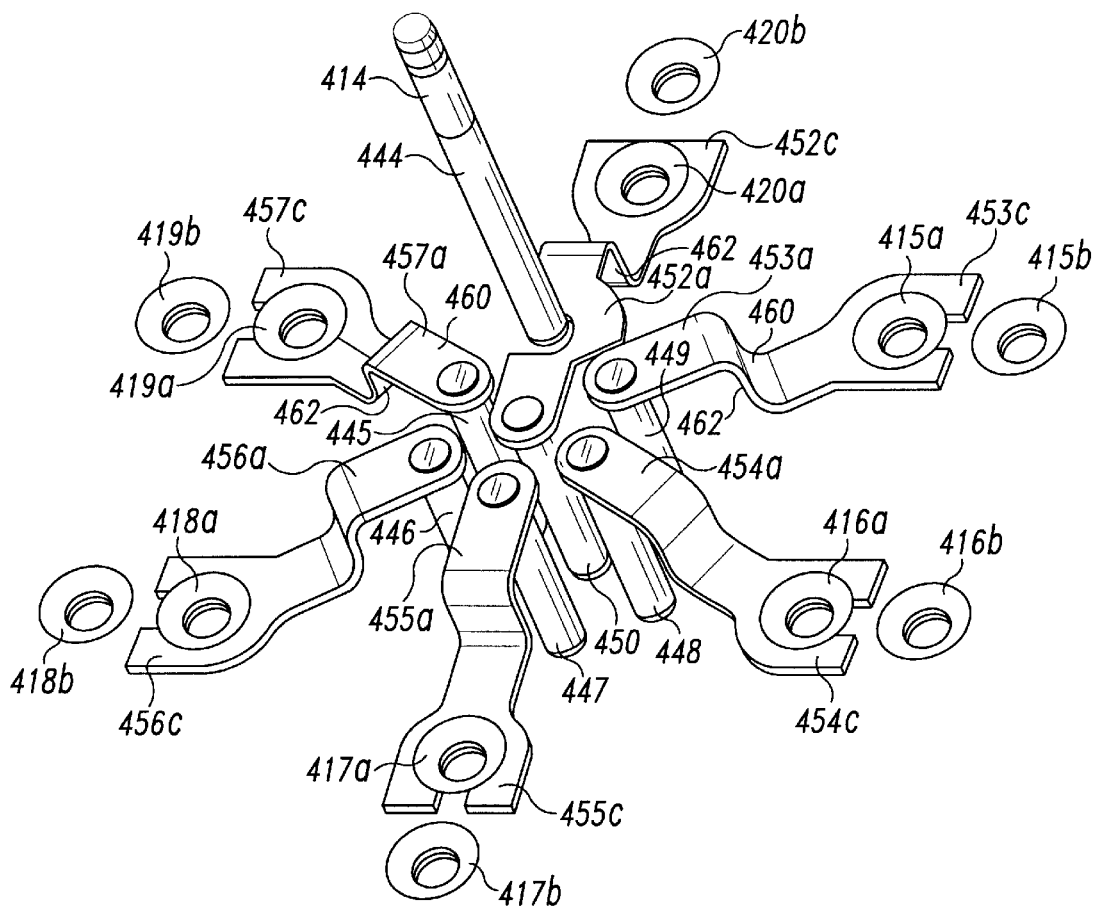
FIG. 15 is a perspective view of the electrical connection of the circuit breaker-ring terminal connector assembly of FIG. 13.

FIGS. 13–15 show a circuit breaker-ring terminal connector assembly 402, a third embodiment of the interchangeable connector assembly 160 of the present invention. Circuit breaker-ring terminal connector assembly 402 provides multiple connecting positions for ring-terminals in a stacking arrangement to the circuits bridging in a tractor/trailer combination. In addition, circuit breaker-ring terminal connector assembly 402 provides circuit breaker protection for each of the circuits. Circuit breaker-ring terminal connector assembly 402 is of a one-piece construction, having a plate-like body 404 which includes a first side 406 and a second side 408. FIGS. 13 and 14 show the exterior features of circuit breaker-ring terminal connector assembly 402. FIG. 15 shows the electrical connections of circuit breaker-ring terminal connector assembly 402.

FIG. 13 shows first side 406 of circuit breaker-ring terminal connector assembly 402. Centrally defined on first side 406 is raised cap 410 extending above first side 406. Raised cap 410 includes a top face 412 and a key projection 422 protruding from the side of raised cap 410. Extending from top face 412 of raised cap 410 is platform 424 having a secondary pin 414 protruding therethrough. Platform 424 adds rigidity and stabilizing support to secondary conducting pin 414 contained therein. Surrounding raised cap 410 are sets of contact plates 415–420. Each sets of contact plates 415–420 includes an inner contact plate 415a–420a and an outer contact plate 415b–420b. Each inner contact plate, 415a–420a, includes an inner plate aperture 466, and each outer contact plate, 415b–420b, includes an outer plate aperture 468; inner and outer plate apertures 466 and 468 are sized to receive a circuit breaker 470.

Circuit breakers 470, preferably of conventional style, include a first terminal post 472 and a second terminal post 474 extending upwardly from a breaker body 478. Posts 472 and 474 are electrically connected inside breaker body 478 via a fusible link (not shown) which will cause the electrical circuit to open when the connected circuit is overloaded. Circuit breaker 470 is installed to circuit breaker ring-terminal assembly 402 by first inserting terminal posts 472 and 474 from second side 408 of body 404 through plate apertures 466 and 468, and then threading nuts 480 down posts 472 and 474, thus securing circuit breaker 470 to body 404. Preferably, a conducting washer 482 is placed between each nut 480 and contact plate, 415a–420a, 415b–420b, to ensure electrical contact. While only three circuit breakers 470 are shown in FIG. 13, it is understood that circuit breaker 470 can be installed within each contact plate sets 415–420.

Secondary pin 414 and contact plate sets 415–420 are provided as connecting points to the electrical circuits bridging the tractor/trailer combination. In the illustrated embodiment where the bridging circuits are configured according to the SAE-J1067/J560 standards, secondary pin 414 enables connection to the white circuit; inner contact plate 415a enables connection to the brown circuit; inner contact plate 416a enables connection to the green circuit; inner contact plate 417a enables connection to the red circuit; inner contact plate 418a enables connection to the yellow circuit; inner contact plate 419a enables connection to the black circuit; and inner contact plate 420a enables connection to the blue circuit. Inner and outer contact plates, 415a–420a and 415b–420b, respectively, are not electrically connected. The electrical links between inner contact plates 415a–420a and outer contact plates 415b–420b are made through circuit breakers 470 inserted between inner contact plates 415a–420a and outer contact plates 415b–420b. Therefore, outer contact plates 415b–420b provide connection to the same circuits as the corresponding inner contact plates 415a–420a. In addition, because the electrical connection is made through the fusible link (not shown) of circuit breakers 470, the circuit links are circuit breaker protected.

In practice, connections to the bridging circuits are accomplished through connections to terminal posts 472 and 474 of circuit breakers 470 installed between the contact plate sets 415–420. Secondary pin 414 and terminal posts 472, 474 are adapted to receive conventional ring-terminal connectors. Preferably, secondary pin 414 and breaker posts 472 and 474 are of sufficient height to accommodate multiple ring-terminals by stacking. Also preferably, secondary pin 414 and breaker posts 472 and 474 are #10 threaded posts for accepting #10 ring terminals.

Separating circuit breakers 470 are wells 428 formed on first side 406 and scattered in between the contact plates 415–420. Wells 428 separate each of the circuit breakers 470 from its neighbors, thus avoiding the inadvertent contact of the cable wires. For mounting connector assembly 402 to nosebox housing 152, a set of mounting apertures 438 are included through body 404 for receiving fasteners. Preferably, mounting apertures 438 are spaced a distance apart for even distribution of the attachment forces.

Referring now to FIG. 14 which shows second side 408 of circuit breaker-ring terminal connector assembly 402. Recessed within second side 408 is a raised cap cavity 440 which complements raised cap 410 formed on first side 406. Extending from raised cap cavity 440 are seven primary conducting pins 444–450 configured as a socket for receiving a SAE-J560b plug connector. While circuit breaker-ring terminal connector assembly 402 as illustrated is adapted to be compatible with SAE-J560b standard, it is to be understood that the present invention contemplates providing a circuit breaker-ring terminal connector assembly having other than a SAE-J560b configuration.

A key slot 442 is formed on the wall of cap cavity 440. Key slot 442 complements to key projection 422 which is formed on first side 406. Key slot 442 is provided as a guide for aligning circuit breaker-nosebox plug connector assembly 402 to nosebox housing 152. Surrounding raised cap cavity 440 are inner and outer contact apertures 466 and 468, respectively, and are mounting apertures 438.

Referring now to FIG. 15 which shows the electrical connections of circuit breaker-ring terminal connector assembly 402, the electrical connections are made and organized by the use of connecting conductors. Preferably, the connecting conductors are bar conductors 452–457. Conducting pins and contact plates which are connected to the same bar conductor are electrically connected. Bar conductors 452–457 include first surfaces and second surfaces, 460 and 462, respectively. As discussed previously, bar conductors 452–457 may be formed as a track or as separate pieces. In addition, bar conductors 452–457 are preferably formed of brass. However, other conducting material having adequate electric conductivity and formability may be used.

Each bar conductors 452–457 are bent into a "step" shape, defining a central portion 452a–457a and an auxiliary portion 452c–457c. Auxiliary portions 452c–457c are U-shaped. Connecting to first surface 460 of bar conductors 452–457 are inner contact plates 415a–420a. Inner contact plates 415a–420a are attached to auxiliary portions 452c–457c, preferably between the two arms of auxiliary portions 452c–457c. Inner contact plates 415a–420a, as attached, extend above first surface 406 of auxiliary portions 452c–457c. Spaced apart from inner contact plates 415a–420a are outer contact plates 415b–420b. Outer contact plates 415b–420b are not directly connected to bar conductors 452–457. The distance between inner plates 415a–420a and outer contact plates 415b–420b are set for receiving terminal posts 472, 474 of circuit breakers 470.

Connecting to and extending below second surface 462 of bar conductors 452–457 are primary or central conducting pins 445–450. Primary pins 445–450 are part of a set of primary pins 444–450 which is adapted to meet the SAE-J560 standard. Because the number of primary pins 444–450 are one more than the number of bar conductors 452–457, primary pin 444 is joined directly to secondary pin 414. The joined primary/secondary pin 444/414 is positioned among the attached primary pins 445–450, and completes a socket in accordance with the SAE-J560 standard. Each primary conducting pin 444–450 is adapted to accept a terminal from an SAE-J560b plug connector. Primary conducting pin 444 is slightly larger in diameter than the other six primary conducting pins 445–450, and is conventionally referred to as the white pin for accepting the ground or white circuit. Moving clockwise from primary pin 444 are primary pin 445 adapted to accept the black circuit, primary pin 446 adapted to accept the yellow circuit, primary pin 447 adapted to accept the red circuit, primary pin 448 adapted to accept the green circuit, primary pin 449 adapted to accept the brown circuit, and primary pin 450 adapted to accept the blue circuit.

After the primary pins 444–450 and the sets of contact plates 414–420 are attached as described above, secondary pin 414 is electrically connected to primary pin 444, thus providing connection to the white circuit; inner contact plate 415a is electrically connected to primary pin 449, thus providing connection to the brown circuit; inner contact plate 416a is electrically connected to primary pin 448, thus providing connection to the green circuit; inner contact plate 417a is electrically connected to primary pin 447, thus providing connection to the red circuit; inner contact plate 418a is electrically connected to primary pin 446, thus providing connection to the yellow circuit; inner contact plate 419a is electrically connected to primary pin 445, thus providing connection to the black circuit; and inner contact plate 420a is connected to primary pin 450, thus providing connection to the blue circuit.

Preferably, the primary conducting pins 445–450 and inner contact plates 414a–420a are connected by welding to bar conductors 452–457. However, other methods which can conductively secure the conducting pins and the contact plates to the bar conductors may be used. Furthermore, while bar conductors 452–457 are used as electrical conductors in the illustrated embodiment, it is contemplated that other types of connecting electrical conductors, for example, conductive wires, may also be used.

After the various conducting pins and contact plates are connected to the bar conductors as described above, the bar conductor-conducting pins assembly is insert molded as previously described with an insulating fluid compound to form body 404 of circuit breaker-ring terminal connector assembly 402. The molding compound is cured to a solid state forming a plate and sealing bar conductors 452–457, thereby providing protection against environmental corrosion. The primary pins 444–450, secondary pin 414, and sets of contact plates 415–420 are partially embedded in the molding compounds, thereby the positions of the pins and plates are stabilized. Preferably the molding compound is glass filled nylon. The amount of glass may vary depending on the strength and rigidity required. The preferred range is between 20–30% glass. While glass filled nylon is chosen for the illustrated embodiments, other non-conducting, moldable materials having the necessary strength and rigidity may also be used.

D. Circuit Breaker-Nosebox Plug Connector Assembly

Figure 16:
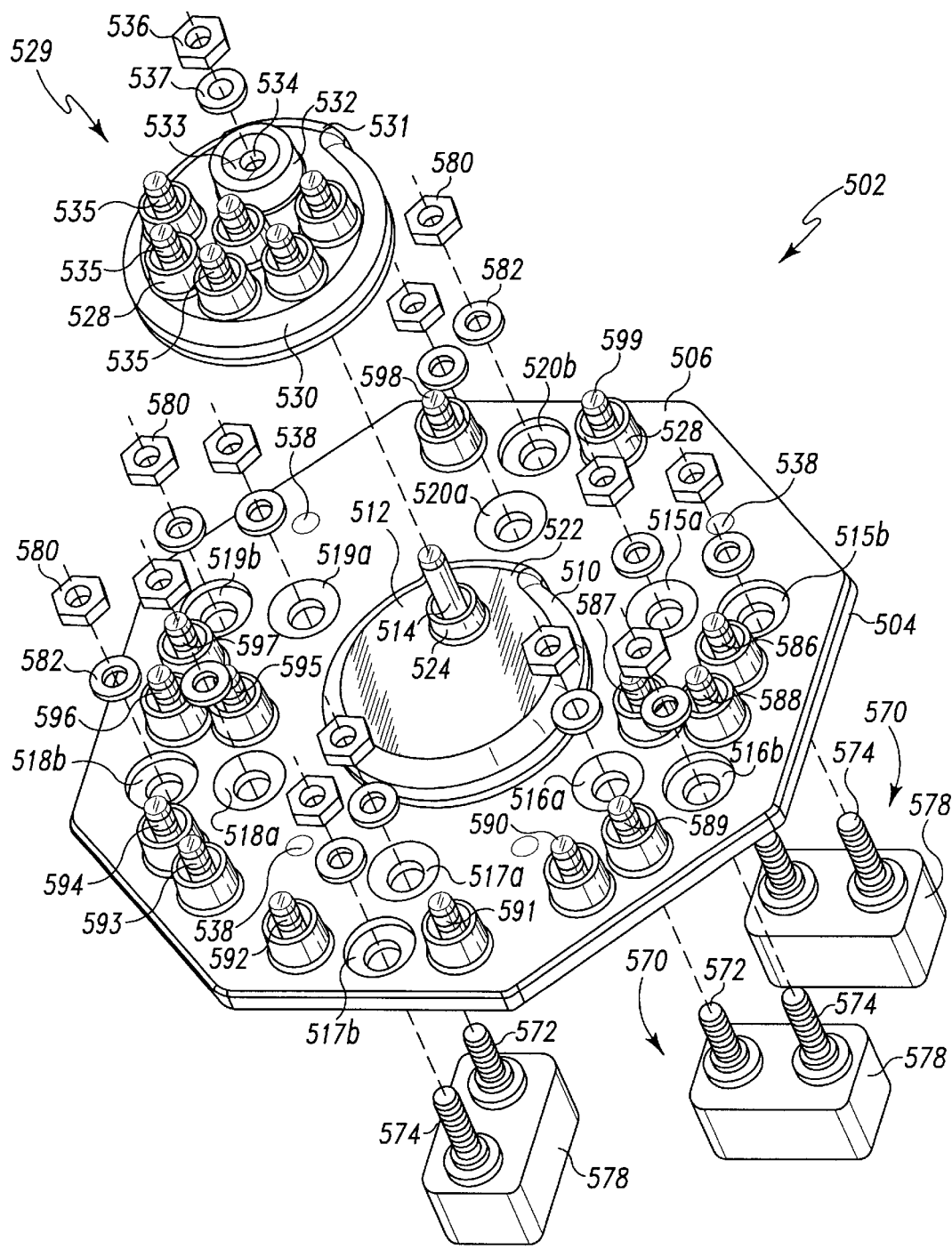
FIG. 16 is a exploded view of the first side of a circuit breaker-nosebox plug connector assembly, which illustrates a portion of a fourth embodiment of the interchangeable connector assembly of the present invention.
Figure 17:
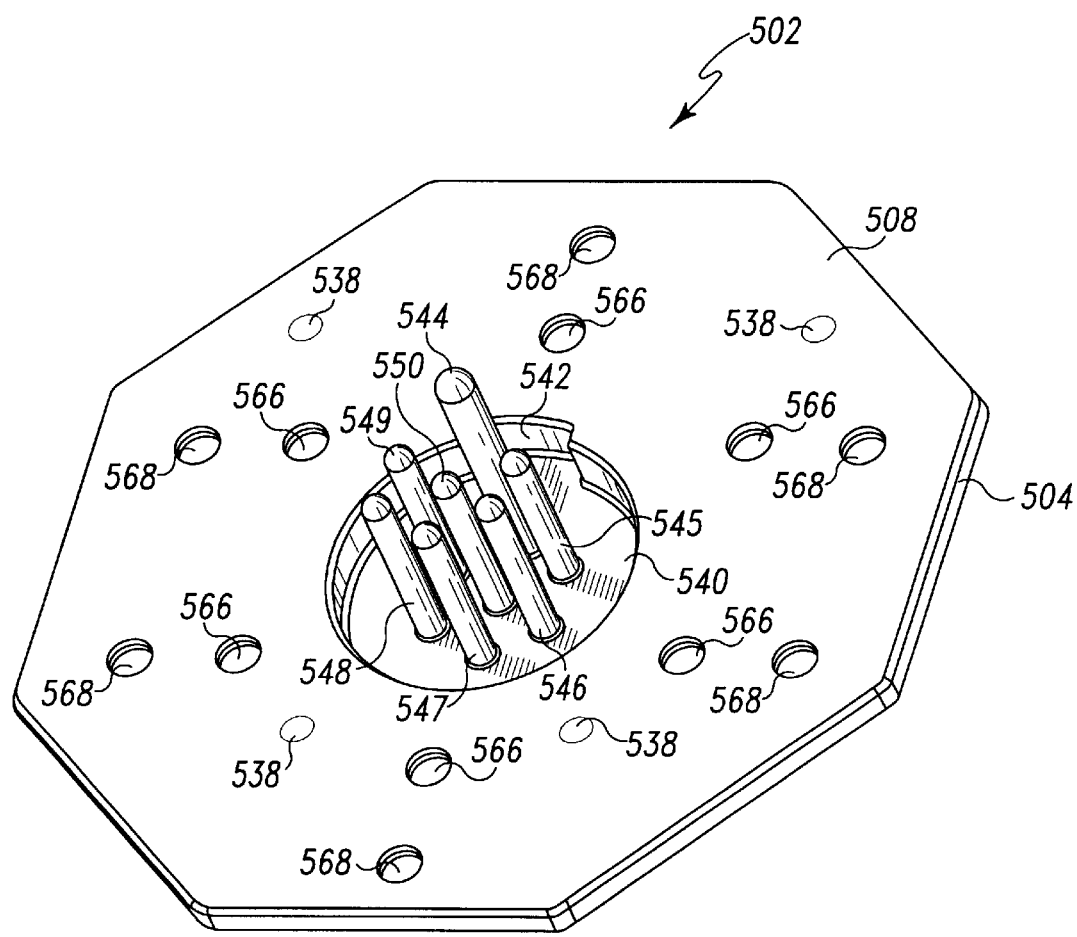
FIG. 17 is a perspective view of the second side of the circuit breaker-nosebox plug connector assembly of FIG. 16.
Figure 18:
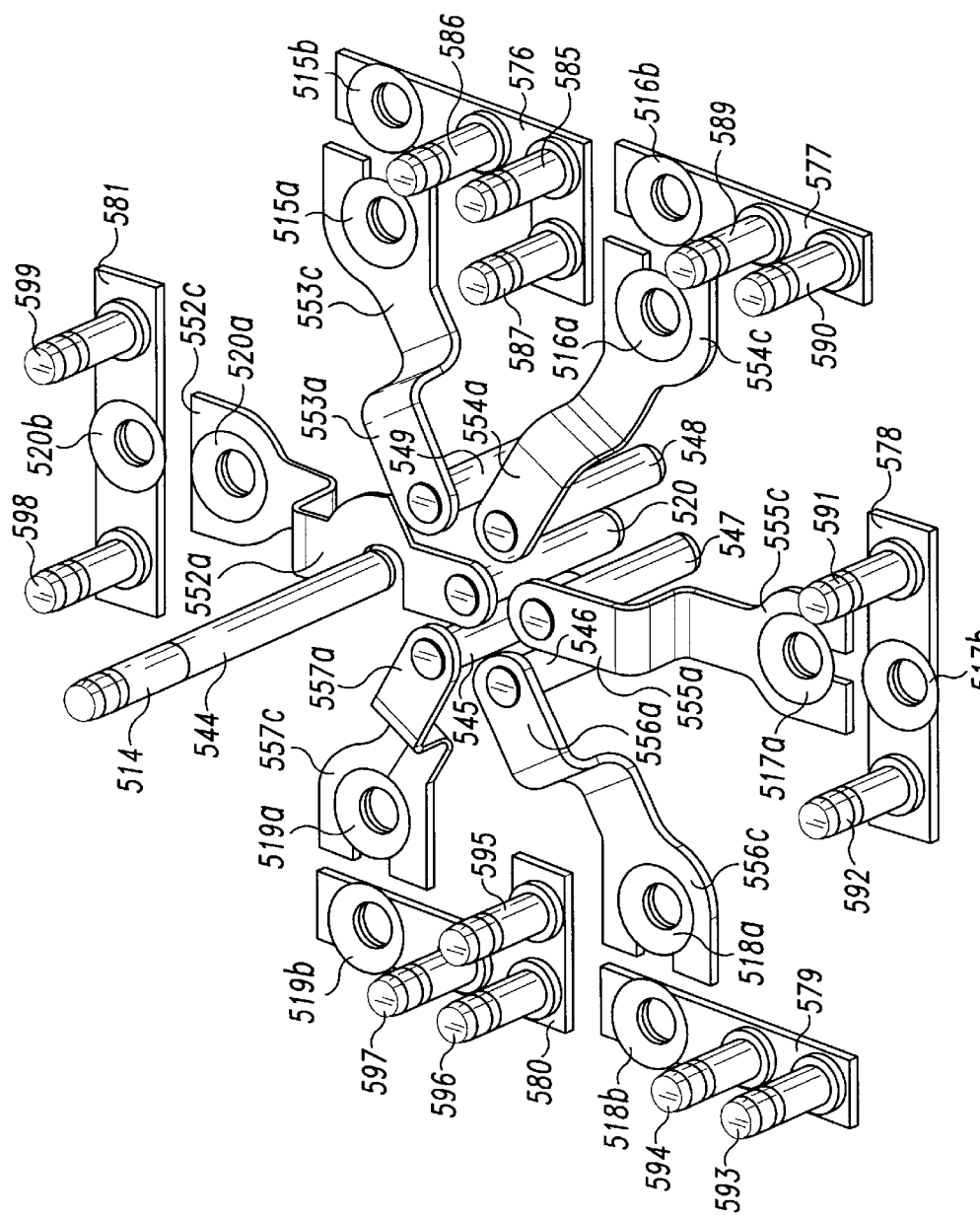
FIG. 18 is a perspective view of the electrical connection of the circuit breaker-nosebox plug connector assembly of FIG. 16.

FIGS. 16–18 show a circuit breaker-nosebox plug connector assembly 502, a fourth embodiment of the interchangeable connector assembly 160 of the present invention. Circuit breaker-nosebox plug connector assembly 502 provides the flexibility of multiple connections, via both ring-terminals and conventional push-on sealed plug terminals, to the electrical circuits bridging the tractor/trailer combination. Additionally, circuit breaker-nosebox plug connector assembly 502 provides circuit breaker protection for the circuits. Circuit breaker-nosebox plug connector assembly 502 is of a one-piece construction, having a plate-like body 504 which includes a first side 506 and a second side 508. FIGS. 16 and 17 show the exterior features of circuit breaker-nosebox plug connector assembly 502. The FIG. 18 shows the hidden electrical connections of circuit breaker-nosebox plug connector assembly 502.

Referring now to FIG. 16, which shows first side 506 of circuit breaker-nosebox plug connector assembly 502, centrally defined on first side 506 is a raised cap 510 which extends above first side 506. Raised cap 510 includes a top face 512 and a key projection 522 protruding from the side of raised cap 510. Extending from top face 512 is a platform 524 having a secondary conducting pin or secondary pin 514 protruding therethrough. Platform 524 adds rigidity and stabilizing support to secondary conducting pin 514 containing therein. Surrounding raised cap 510 and extending through body 504 are sets of contact plates 515–520. Each set of contact plates 515–520 further includes an inner contact plate 515a–520a and an outer contact plate 515b–520b. Additionally, each of the inner contact plates 515a–520a includes an inner plate aperture 566, and each of the outer contact plates 515b–520b includes an outer plate aperture 568. Inner and outer plate apertures 566 and 568, respectively, are sized to receive the terminal posts of a circuit breaker. Disposed between inner and outer contact plates, 515a–520a and 515b–520b, respectively, are free standing wells 528 each having an adjunct pin 586–599 protruding therethrough.

Circuit breakers 570, preferably of conventional style, include a first terminal post 572 and a second terminal post 574 extending upwardly from a breaker body 578. Terminal posts, or breaker posts, 572 and 574 are electrically connected inside breaker body 578 via a fusible link (not shown) which will cause the connected electrical circuit to open when it is overloaded. Circuit breakers 570 are installed on circuit breaker-nosebox plug connector assembly 502 by inserting terminal posts 574 and 572 from second side 508 of body 504, through plate apertures 566 and 568, and then threading nuts 580 down terminal posts 572 and 574, thereby securely retaining circuit breakers 570 to body 504. Preferably, a conducting washer 582 are placed between each nut 580 and contact plate 515a–520a and 515b–520b to ensure electrical contact. While only three circuit breakers 570 are shown in FIG. 16, it is understood that more or fewer circuit breakers 570 can be installed.

Secondary pin 514, adjunct pins 586–599 and contact plate sets 515–520 are provided as connection points to the circuits bridging the tractor/trailer combination. In the illustrated embodiment, where the bridging circuits are configured according to the SAE-J1067 standards, secondary pin 514 enables connection to the white circuit; inner contact plate 515a enables connection to the brown circuit, inner contact plate 516a enables connection to the green circuit, inner contact plate 517a enables connection to the red circuit, inner contact plate 518a enables connection to the yellow circuit, inner contact plate 519a enables connection to the black circuit, and inner contact plate 520a enables connection to the blue circuit. Outer contact plates 515b–520b and adjunct pins 586–599 provide connection to the circuits only after circuit breakers 570 are installed between the set of contact plates 515–520. Additionally, connection through the outer contact plates and adjunct pins are circuit breaker protected. In the illustrated embodiment, adjunct pins 586–588 and outer contact plate 515b provide connection to the brown circuit; adjunct pins 589–590 and outer contact plate 516b provide connection to the green circuit; adjunct pins 591–592 and outer contact plate 517b provide connection to the red circuit; adjunct pins 593–594 and outer contact plate 518b provide connection to the yellow circuit; adjunct pins 595–597 and outer contact plate 519b provide connection to the black circuit; and adjunct pins 598–599 and outer contact plate 520b provide connection to the blue circuit.

Adjunct pins 586–599 are adapted to receive conventional push-on-sealed plug terminals. Preferably, adjunct pins 586–599 are approximately 0.18 inches in diameter. While the above number and position of adjunct pins 586–599 are illustrated, it is contemplated that a greater or lesser number of adjunct pins 586–599 may be utilized without deviation from the spirit and scope of the invention.

Further, connection to the contact plates 515–520 are, in practice, through terminal posts 572, 574 of circuit breakers 570. Secondary pin 514 and terminal posts 572, 574 are adapted to receive conventional ring-terminal connectors. Preferably, secondary pin 514 and terminal posts 572, 574 are of sufficient height to accommodate multiple ring-terminals by stacking. Also preferably, secondary pin 514 and breaker posts 572, 574 are #10 threaded posts for accepting #10 ring terminals. Wells 528 scattered between contact plate sets 515–520 separate the circuit breakers 570, thus providing protection from inadvertent contact of the cable wires. For mounting circuit breaker-nosebox plug connector assembly 502 to nosebox housing 152, a set of mounting apertures 538 is provided. Mounting apertures 538 disposed through body 504 are adapted for receiving fasteners. Preferably, mounting apertures 538 are spaced apart for even distribution of the attachment forces.

Extra connection points to the white or ground circuit, when using conventional nosebox plug terminals, are provided by a ground cap 529. Ground cap 529 includes a ground contact plate or ground plate 533 contained within a pin boss 532. Group cap 529 further includes a plurality of ground pins 535, each extending from free standing wells 528. Ground pins 535 are in electrical contact with ground plate 533. Ground cap 529 is adapted to engage raised cap 510. When ground cap 529 is fitted over raised cap 510, ground cap guide 531 aligns with key projection 522, and pin boss 532 engaging platform 524, such that secondary pin 514 extends through aperture 534 and is in electrical contact with ground plate 533. Ground cap 529 is held in place by nut 536 threaded onto secondary pin 514. Preferably, a conducting washer 537 is placed between nut 536 and ground plate 533 to ensure electrical contact. When contact plate 533 is in electrical contact with secondary pin 514, all ground pins 535 are in electrical contact with secondary pin 514, thus providing connection points to the ground or white circuit. Ground pins 535 are adapted to receive conventional push-on-sealed plug terminals. Preferably, ground pins 535 are approximately 0.18 inches in diameter. While six ground pins 586–599 are illustrated, it is contemplated that a greater or lesser number of ground pins 586–599 may be utilized without deviation from the spirit and scope of the invention.

Referring now to FIG. 17 which shows second side 508 of circuit breaker-nosebox plug connector assembly 502, recessed within second side 508 is raised cap cavity 540 which complements raised cap 510 formed on first side 506. Extending from raised cap cavity 540 are seven primary conducting pins 544–550 configured as a socket for receiving a SAE-J560b plug connector of a SAE-J1067 cable. Behind central pin 544 formed on the wall of cap cavity 540 is key slot 542. Key slot 542 corresponds to key projection 522 formed on first side 506. Key slot 542 is provided as a guide for aligning circuit breaker-nosebox plug connector assembly 502 to nosebox housing 152. While circuit breaker-nosebox plug connector assembly 502 is adapted to be compatible with SAE-J560b interfacing hardware, it is to be understood that the present invention contemplates providing multiple connection points for ring-terminals and nosebox plug terminals with electrical connections having other than SAE-J560b/J1067 standards.

Referring now to FIG. 18 which shows the electrical connections of circuit breaker-nosebox plug connector assembly 502, electrical connections are made and organized by the use of connecting conductors. Preferably, the connecting conductors used are main bar conductors 552–557 and adjunct bar conductors 576–581. Main bar conductors 552–557 include first surfaces and second surfaces, 560 and 562, respectively. Main bar conductors 552–557 may be formed as a track or as separate pieces. Preferably, main and adjunct bar conductors, 552–557 and 576–581, respectively, are formed of brass. However, other conducting material having similar electric conductivity and formability may be used.

Each main bar conductor 552–557 is bent to a "step" shape, defining a central portions 552a–557a and an auxiliary portion 552c–557c. Auxiliary portions 552c–557c are U-shaped, having two arms.

Connecting to first surface 560 of auxiliary portions 552c–557c of main bar conductors 552–557 are inner contact plates 515a–520a. Contact plates 515a–520a as connected extend above first surface 506 of main bar conductors 552–557. Spaced apart from inner contact plates 515a–520a are outer contact plates 515b–520b. The set of contact plates 515a–520a and 515b–520b are adapted for receiving the terminal posts of a circuit breaker 570.

Connecting to the second surface 562 of primary portion 552a–557a of main bar conductors 552–557 are primary or central conducting pins 545–550. Preferably, primary conducting pins 545–550 are insert welded to main bar conductors 552–557. However, other methods which can conductively secure the conducting pins to bar conductors may be used. Primary pins 545–550 are part of a set of primary pins 545–550 which are adapted to meet the SAE-J560 standard. Because the number of primary pins 544–550 are one more than the number of main bar conductors 552–557, primary pin 544 is not attached to a bar conductor and is joined to secondary pin 514. Joined primary/secondary pin 544/514 is positioned among the attached primary pins 545–550, completing a socket in accordance with SAE-J560b standard. Each primary conducting pin 545–550 is adapted to accept a terminal from a SAE-J560b plug connector. Primary conducting pin 544 is slightly larger in diameter than the other six primary conducting pins 545–550, and is conventionally referred to as the white pin for accepting the ground or white circuit. Moving clockwise from primary pin 544 are primary pin 545 adapted to accept the black circuit, primary pin 546 adapted to accept the yellow circuit, primary pin 547 adapted to accept the red circuit, primary pin 548 adapted to accept the green circuit, primary pin 549 adapted to accept the brown circuit, and primary pin 550 adapted to receive the blue circuit.

After the primary pins 545–550 and inner contact plates 515a–520a are connected to main bar conductors 552–557, inner contact plate 515a is connected to primary pin 549 and provides connection to the brown circuit, inner contact plate 516a is connected to primary pin 548 and provides connection to the green circuit, inner contact plate 517a is connected to primary pin 547 and provides connection to the red circuit, inner contact plate 518a is connected to primary pin 546 and provides connection to the yellow circuit, inner contact plate 519a is connected to primary pin 545 and provides connection to the black circuit, and inner contact plate 520a is connected to primary pin 550 and provides connection to the blue circuit. Additionally, secondary pin 514 is electrically connected to primary pin 544 and provides connection to the white circuit.

Surrounding main bar conductors 552–557 are adjunct bar conductors 576–581. Connecting on and extending above adjunct bar conductors 576–581 are adjunct pins 586–599 and outer contact plates 514b–520b. In the illustrated embodiment, outer contact plate 515b and adjunct pins 586–588 are attached to adjunct bar 576; outer contact plate 515b and adjunct pins 589–590 are attached to adjunct bar 577; outer contact plate 517b and adjunct pins 591–592 are attached to adjunct bar 578; outer contact plate 518b and adjunct pins 593–594 are attached to adjunct bar 579; outer contact plate 519b and adjunct pins 595–597 are attached to adjunct bar 580; outer contact plate 520b and adjunct pins 598–599 are attached to adjunct bar 581. Adjunct bar conductors 576–581 are not electrically connected to main bar conductors 552–557, thus inner contact plates 514a–520a and outer contact plates 514b–520b are not electrically connected. The electrical links between inner contact plates 514a–520a and outer contact plates 514b–520b are made through circuit breakers 570 inserted between inner and outer contact plates 514a–520a, 514b–520b, respectively. Therefore, outer contact plates 514b–520b provide connection to the same circuits as the corresponding inner contact plates 514a–520a. In addition, because the electrical connection is made through the fusible link (not shown) of circuit breakers 570, the circuit connections are circuit breaker protected. While main bar conductors 552–557 and adjunct bar conductors 576–581 are used as electrical links in the illustrated embodiment, it is contemplated that other types of connecting conductors, for example conductive wires, may also be used.

After the various conducting pins, contact plates, main bar connectors and adjunct bar conductors are electrically connected as described above, the assembly is insert molded with a insulating fluid compound to form body 504. The molding compound is cured to a solid state forming a rigid plate and sealing main bar conductors 552–557, adjunct bar conductors 576–581, and the various welding joints, thus providing protection against environmental corrosion. In addition, the primary pins 544–550, secondary pins 514, adjunct pins 586–599, and contact plates 515–520 are partially embedded in the molding compounds, therefore the pin and contact plate positions are stabilized.

Preferably the molding compound is glass filled nylon. The amount of glass may vary depending on the strength and rigidity required. The preferred range is between 20–30% glass. While glass filled nylon is chosen for the illustrated embodiments, other non-conducting, moldable materials having acceptable strength and rigidity may also be used.

E. Nosebox Housing

Figure 19:
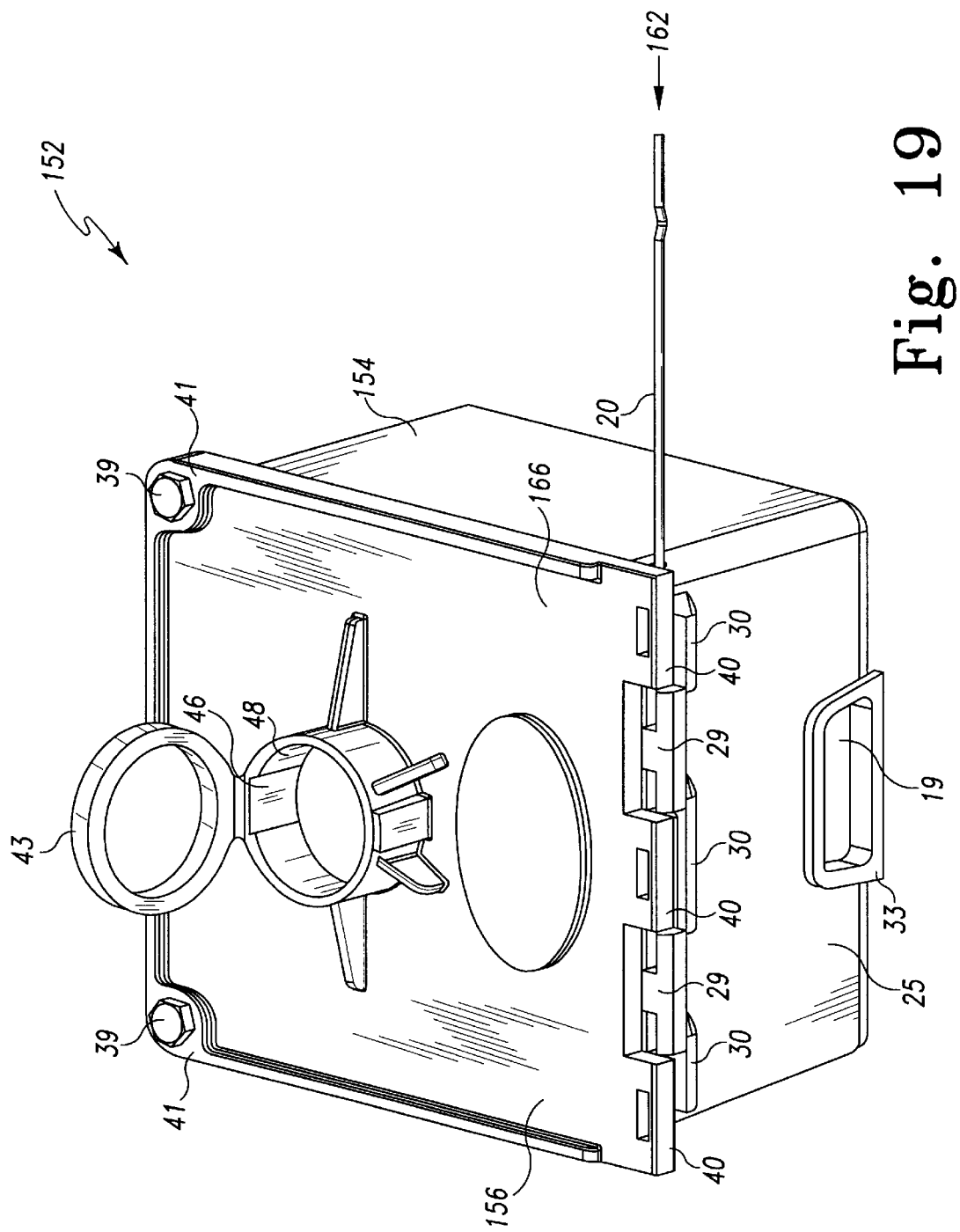
FIG. 19 is a perspective view of an embodiment of a nosebox housing and cover of the present invention.

Nosebox housing 152 is provided to house the interchangeable connector assemblies 160. FIG. 19 shows the exterior of one embodiment of a nosebox housing 152 of the present invention. Housing 152 is sized to accommodate the interchangeable connector assemblies 160 and the associated electrical cables (not shown) making connections with the connector assemblies 160. With the expanded number of connection positions available on the connector assemblies, it is likely that with the number of cables will exceed the size and number (7) proscribed by the SAE-J560b/J1067 standards. Preferably, housing 152 is sized larger than prior art nose boxes. In the illustrated embodiment, housing 152 is generally square, approximately 7.25 inches on each side, and between approximately 3.5 inches to 5 inches deep. While it is shown that housing 152 is approximately square, other housing shapes may be utilized. Housing 152 is constructed of glass filled nylon. The amount of glass may vary, preferably approximately 20% of glass is used. However, other materials which have acceptable strength, rigidity and weathering characteristics may also be used.

Figure 20:
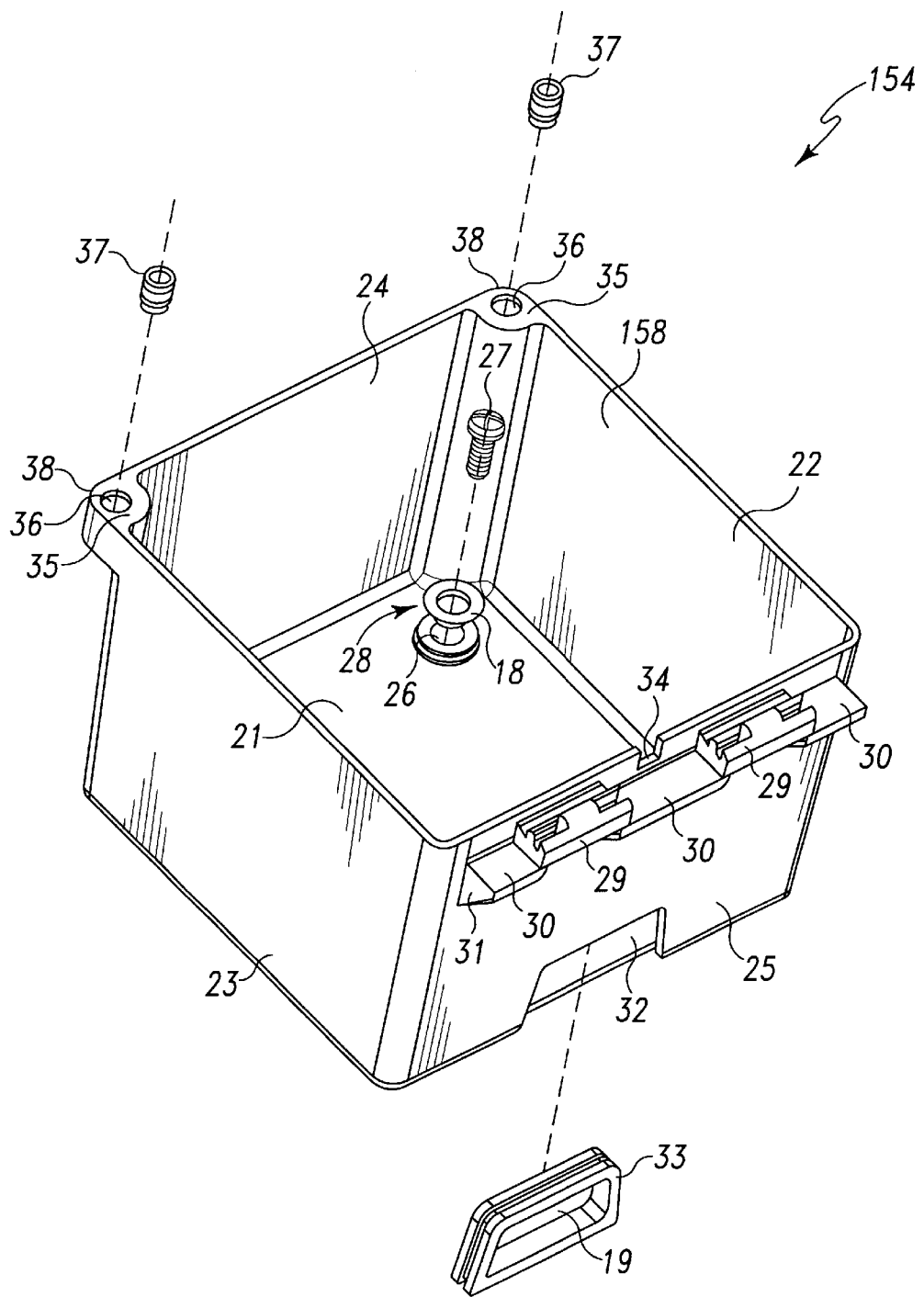
FIG. 20 is a perspective view of the tray member of the nosebox housing of FIG. 19.

Nosebox housing 152 includes a cover member 156 and a tray member 154, together defining an interior space 158 (FIG. 20) thereinbetween. Cover member 156 is hingeably engaged to tray member 154 by a hinge rod 20 threading alternatively through hinge members 40 and 29 of cover member 156 and tray member 154, respectively. Hinge rod 20 is bent at one end such that it is retained in position by one of the hinge members 40 and 29 and is prevented from disengaging by the vibration of a moving vehicle. Preferably, nose box 150 is mounted to a tractor or trailer in the orientation as shown in FIG. 19 having the hinge axis 162 at the bottom such that cover member 156 opens downward. Cover member 156 can be maintained in a closed position by locking screws 39 threading through upper corners 41 of cover member 156 to tray member 154. The degree of opening of cover member 156 is limited by shelves 30. Shelves 30 disposed below hinge members 29 interfere with cover member 156 when cover member 156 is opened to an approximately 95 degree angle, thereby forming a posi-stop. Shelves 30 are supported and strengthened by ribs 31 (FIGS. 6 and 20). While three shelves 30 are shown in the illustrated embodiment, it is contemplated that a greater or lesser number of shelves may be utilized.

A socket cover plate 43 is located on outside surface 166 of cover member 156. Socket cover plate 43 covers the entrance to a socket cavity 48. Socket cover plate 43 is hingeably engaged to cover member 156. Although not shown in detail in the drawings, the pivotal attachment between plate 43 and cover member 156 is preferable such that plate 43 is biased toward its downward (closed) position as shown in order to protect the socket from the environment.

FIG. 20 is a perspective view of tray member 154. Tray member 154 includes a back wall 21, and right, left, top and bottom walls, 22, 23, 24, and 25, respectively, extending therefrom. Back wall 21 of tray member 154 includes a plurality of mounting holes 26 for receiving mounting bolts 27 for securing tray member 154 to a tractor 52 or trailer 64 (not shown). Brass eyelets 28, inserted in mounting holes 26, protect tray member 154 from thread damage in the event that mounting bolts 27 are over-torqued. Preferably, brass eyelet 28 has a wide flange 18 such that a ring terminal can be secured on top to produce a redundant ground.

For receiving locking screws 39 (FIG. 19) to secure cover member 156 to tray member 154, corners 38 adjacent top wall 24 are thickened such that receiving bores 36 can be included. Threaded brass inserts 37 adapted to receive locking screw 39 are placed into receiving bores 36. Brass inserts 37 reduce thread damage from repeated opening and closing of cover member 156.

Access 32, defined through bottom wall 25, provides access for electrical cables to interchangeable connector assembly 160. A grommet 33 is fitted into access 32. Grommet 33 includes a thin membrane wall 19 having a precut slit allowing entry and exit of the electrical cables (not shown). Thin membrane wall 19 forms around the cable and wires and provides added protection against splash and road salt from entering nosebox housing 152. In the case where water inadvertently collects inside housing member 152, a notch 34 defined at the front edge of bottom wall 25 is provided to facilitate drainage.

Figure 21:
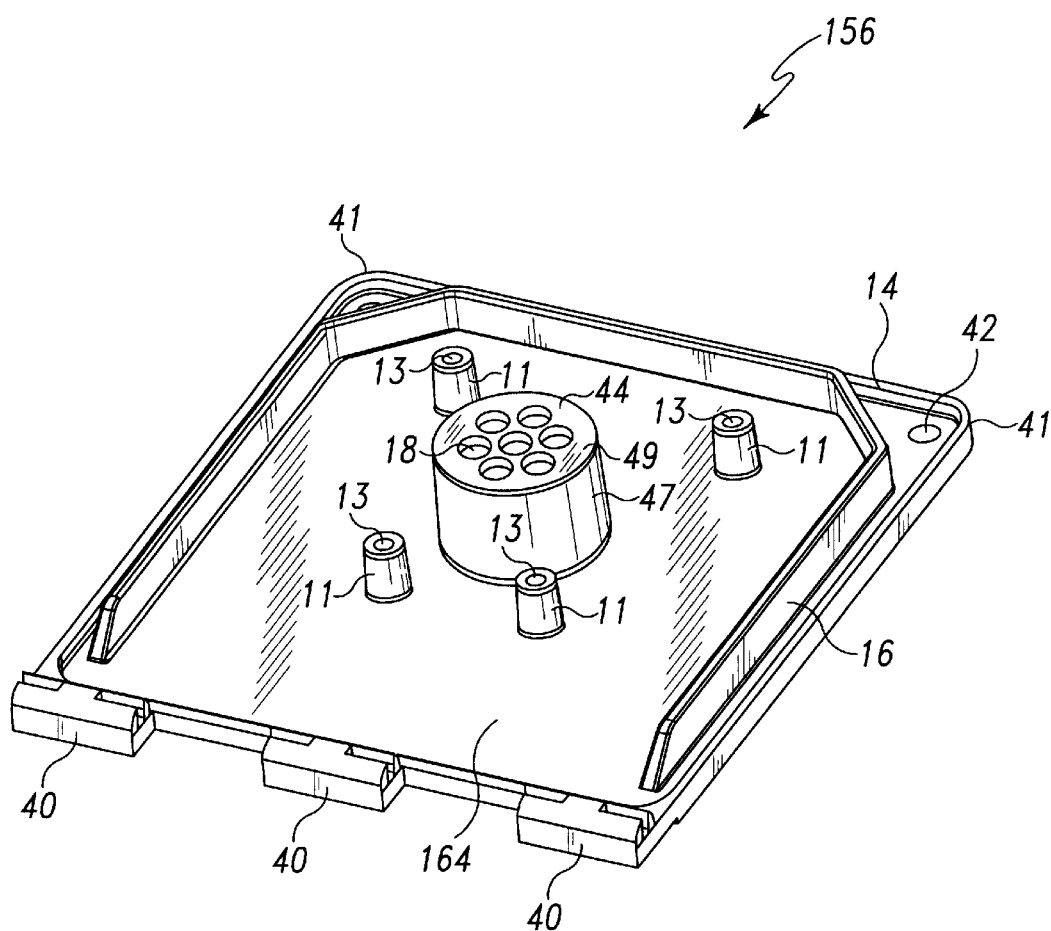
FIG. 21 is a perspective view of the cover member of the nosebox housing of FIG. 19.

FIG. 21 is a perspective view of interior surface 164 of cover member 156. A socket housing 47 is formed on interior surface 164. Socket housing 45 defines corresponding socket cavity 48 adapted for receiving a SAE-J560b plug connector. Seven perforations 18 configured in accordance with the SAE-J560b standard are defined on face 49 of socket housing 47. Perforations 18 allow passage of the conducting pins forming the socket, e.g. primary pins 244–250 of nosebox plug connector assembly 202. Socket guide 44 protrudes from the side of socket housing 47 corresponding to a guide slot 46 within socket cavity 48 for aligning a SAE-J560b plug connector. Also defined on interior surface 164 of cover member 156 are receiver bosses 11. Receiver bosses 11 adapts to engage interchangeable connector assemblies 160 and including receiving apertures 13 for receiving fasteners.

Cover member 156 is sized to receive tray member 154. An overhang 14 formed around the edge of cover member 156 fits over tray member 154 and prevents moisture from entering interior space 158. Preferably, a gasket (not shown) is placed adjacent to overhang 14 providing a tighter environmental seal. Defined on interior surface 164 is U-shaped flange 46. U-shaped flange 16 channels the electrical cables/wires (not shown) into interior space 158 when cover member 156 is closing onto tray member 154. Formed on the bottom edge of cover member 156 is a set of hinge members 40 for engaging tray member 154. For securing cover member 156 to tray member 154, bores 42, included at corners 41, are adapted to receive locking screws 39.

FIG. 6 is an exploded diagram of nosebox 150, showing the assembly of an interchangeable connector assembly 160 and nosebox housing 152. A nosebox plug connector assembly 202, an embodiment of interchangeable connector assembly 160, is used for illustrative purposes. However, all other embodiments of interchangeable connector assembly 160 of the present invention may be similarly assembled. Housing 152 may be assembled by placing cover member 156 over tray member 154 and juxtaposing hinge members 29 of tray member 154 against hinge member 40 of cover member 156. Hinge rod 20 is inserted through the bores of hinge members 29 and 40 thereby hingeably attaching cover member 156 to tray member 154. Interchangeable connector assembly 160 is placed over socket housing 47 such that turret cavity 240 corresponding to turret 210 engages socket housing 47 and key slot 242 aligns with socket guide 44. Primary pins 244–250 extend through perforations 18 into the socket cavity 48 corresponding to socket housing 47. Mounting bolts 12 pass through mounting aperture 238 and receiver apertures 13 and are received in receiver bosses 11, thereby securing connector assembly 202 to cover member 156.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A nosebox-plug interchangeable connector assembly comprising: a body;
   a plurality of primary conducting pins extending from said body and configured as a socket, wherein each of said primary conducting pins is adapted to receive connection to a circuit;
   a plurality of secondary conducting pins extending from said body, said plurality of secondary conducting pins exceeding said plurality of primary conducting pins in number, and wherein each of said plurality of primary conducting pins is electrically connected to at least one of said plurality of secondary conducting pins;
   wherein said secondary conducting pins are adapted to receive terminal connectors, thereby said secondary conducting pins providing additional electrical connection points to said circuits received by said primary conducting pins;
   wherein electrical connection between said primary conducting pins and said secondary pins are made through bar conductors, said bar conductors having first and second surfaces, wherein said primary conducting pins extend from said second surface and said secondary pins extend from said first surface.

2. The nosebox-plug interchangeable connector assembly of claim 1 wherein said secondary pins are adapted to receive push-on-seal plug terminal connectors.

3. The nosebox-plug interchangeable connector assembly of claim 1 wherein said primary conducting pins are configured as a socket adapted to receive a SAE-J560b plug, whereby each of said primary conducting pins receives connections to one of seven circuits, namely, white, black, yellow, red, green, brown and blue according to a SAE-J1067 convention.

4. The nosebox-plug interchangeable connector assembly of claim 3, wherein six secondary pins are provided for connection to the white circuit, four secondary pins are provided for connection to said brown circuit, three secondary pins are provided for connection to said green circuit, two secondary pins are provided for connection to said red circuit, three secondary pins are provided for connection to said yellow circuit, four secondary pins are provided for connection to said black circuit and one secondary pin is provided for connection to said blue circuit.

5. The nosebox-plug interchangeable connector assembly of claim 1, wherein said body is formed by insert molding with a non-conducting molding compound.

6. The nosebox-plug interchangeable connector assembly of claim 5, wherein said molding compound is 30% glass filled nylon.

7. The nosebox-plug interchangeable connector assembly of claim 1, wherein said primary and secondary conducting pins are insert welded to said bar conductors.

8. The nosebox-plug interchangeable connector assembly of claim 1, wherein said bar conductors are stamp-formed as a track and later separated to form individual circuit; and wherein said bar conductors are brass.

9. A nosebox-plug interchangeable connector assembly comprising:
   a body having a first side forming a socket portion for receiving an electrical connector plug having a plurality of plug conductors, said body having a second opposite side;
   a plurality of primary conducting pins, each of said primary conducting pins having a primary distal end and a primary proximal end, wherein each said primary distal end is positioned within said socket for mating with said electrical connector plug; and wherein each said primary proximal end extends from said second side;
   a plurality of secondary conducting pins extending from said second side, wherein each of said plurality of secondary conducting pins is electrically connected to at least one of said primary conducting pins;
   wherein each of said plurality of plug conductors is electrically connected to at least one primary conducting pin and at least one secondary conducting pin when said electrical connector plug is received in said socket portion.

10. The nosebox-plug interchangeable connector assembly of claim 9, wherein electrical connection between said primary conducting pins and said secondary conducting pins are made through bar conductors, said bar conductors having first and second surfaces, wherein said primary conducting pins extend from said second surface and said secondary pins extend from said first surface.

11. The nosebox-plug interchangeable connector assembly of claim 9 wherein said secondary conducting pins are adapted to receive push-on-seal plug terminal connectors.

12. The nosebox-plug interchangeable connector assembly of claim 9 wherein said primary conducting pins are configured as a socket adapted to receive a SAE-J560b plug, whereby each of said primary conducting pins receives connections to one of seven circuits, namely, white, black, yellow, red, green, brown and blue according to a SAE-J1067 convention.

13. The nosebox-plug interchangeable connector assembly of claim 12, wherein six secondary conducting pins are provided for connection to the white circuit, four secondary conducting pins are provided for connection to said brown circuit, three secondary conducting pins are provided for connection to said green circuit, two secondary conducting pins are provided for connection to said red circuit, three secondary conducting pins are provided for connection to said yellow circuit, four secondary conducting pins are provided for connection to said black circuit and one secondary conducting pin is provided for connection to said blue circuit.

14. The nosebox-plug interchangeable connector assembly of claim 9, wherein said body is formed by insert molding with a non-conducting molding compound.

15. The nosebox-plug interchangeable connector assembly of claim 14, wherein said molding compound is 30% glass filled nylon.

16. The nosebox-plug interchangeable connector assembly of claim 9, wherein said electrical connections between said primary conducting pins and said secondary conducting pins are made through bar conductors.

17. The nosebox-plug interchangeable connector assembly of claim 16, wherein said primary and secondary conducting pins are insert welded to said bar conductors.

18. The nosebox-plug interchangeable connector assembly of claim 16, wherein said bar conductors are stamp-formed as a track and later separated to form individual circuit; and wherein said bar conductors are brass.

19. A nosebox for making electrical connections between a tractor and a trailer, comprising:

at least one first conductor adapted to receive a mating conductor for electrical communication therebetween;

at least one second conductor, wherein each said second conductor is sufficiently tall for accepting multiple ring terminals in stacking configuration;

wherein each said first conductor is electrically coupled to at least one of said at least one second conductor by means of at least one bar conductor.

20. The nosebox of claim 19, wherein said at least one first conductor comprises pins configured as a socket in accordance with SAE J-560b standard.

21. The nosebox-plug interchangeable connector assembly of claim 19 wherein said at least one second conductor is adapted to receive push-on-seal plug terminal connectors.

22. The nosebox-plug interchangeable connector assembly of claim 19 wherein said at least one first conductor is configured as a socket adapted to receive a SAE-J560b plug, whereby each said at least one first conductor receives connections to one of seven circuits, namely, white, black, yellow, red, green, brown and blue according to a SAE-J1067 convention.

23. The nosebox-plug interchangeable connector assembly of claim 22, wherein six second conductors are provided for connection to the white circuit, four second conductors are provided for connection to said brown circuit, three second conductors are provided for connection to said green circuit, two second conductors are provided for connection to said red circuit, three second conductors are provided for connection to said yellow circuit, four second conductors are provided for connection to said black circuit and one second conductors is provided for connection to said blue circuit.

24. The nosebox of claim 19, further comprising a body coupled to said first and second conductors wherein said body is formed by insert molding with a non-conducting molding compound.

25. The nosebox of claim 24, wherein said molding compound is 30% glass filled nylon.

26. The nosebox of claim 19, wherein said first and second conductors are insert welded to said bar conductors.

27. The nosebox of claim 19, wherein said bar conductors are stamp-formed as a track and later separated to form individual circuit; and wherein said bar conductors are brass.

28. The nosebox of claim 19, wherein each said at least one second conductor comprises a number 10 threaded screw post.

29. The nosebox of claim 19, further comprising a plurality of nonconductive dividers, wherein each of said second conductors is separated from adjacent second conductors by at least one of said nonconductive dividers.

* * * * *